United States Patent
Jing et al.

(10) Patent No.: US 8,570,358 B2
(45) Date of Patent: Oct. 29, 2013

(54) AUTOMATED WIRELESS THREE-DIMENSIONAL (3D) VIDEO CONFERENCING VIA A TUNERLESS TELEVISION DEVICE

(75) Inventors: Xiangpeng Jing, San Diego, CA (US); Aravind Asam, San Diego, CA (US); Dipendu Saha, San Diego, CA (US); Seungwook Hong, San Diego, CA (US); Aixin Liu, San Diego, CA (US); Yang Yu, San Diego, CA (US); Andy Nguyen, San Diego, CA (US); Abhishek Patil, San Diego, CA (US); Diung Nguyen, San Diego, CA (US)

(73) Assignee: Sony Corporation, Tokyo (JP)

( * ) Notice: Subject to any disclaimer, the term of this patent is extended or adjusted under 35 U.S.C. 154(b) by 347 days.

(21) Appl. No.: 12/661,372

(22) Filed: Mar. 16, 2010

(65) Prior Publication Data
US 2011/0109715 A1    May 12, 2011

Related U.S. Application Data

(60) Provisional application No. 61/258,997, filed on Nov. 6, 2009.

(51) Int. Cl.
*H04N 7/14*    (2006.01)

(52) U.S. Cl.
USPC ......................................................... 348/14.1

(58) Field of Classification Search
USPC .................. 348/14.01–14.04, 14.08, 14.09
See application file for complete search history.

(56) References Cited

U.S. PATENT DOCUMENTS

| | | |
|---|---|---|
| 4,429,328 A | 1/1984 | Jones et al. |
| 5,668,595 A | 9/1997 | Katayama et al. |
| 6,507,359 B1 | 1/2003 | Muramoto et al. |

(Continued)

FOREIGN PATENT DOCUMENTS

| | | |
|---|---|---|
| CN | 201174743 | 12/2008 |
| KR | 10-2000-0058270 | 10/2000 |

(Continued)

OTHER PUBLICATIONS

Takemura, et al, Stereoscopic Video Movie Camera Using 300K Pixel IT-CCD Sensors, IEEE Transactions on Consumer Electronics, vol. 37, No. I , Feb. 1991.*

(Continued)

*Primary Examiner* — Duc Nguyen
*Assistant Examiner* — Theodore Ndje
(74) *Attorney, Agent, or Firm* — Miller Patent Services; Jerry A. Miller

(57) ABSTRACT

Automated wireless three-dimensional (3D) video conferencing is provided using a tunerless television device. A 3D video conference is automatically established with a wireless device capable of 3D video conferencing using a wireless communication interface of the tunerless television device. A first and a second two-dimensional (2D) video stream are received, using a camera interface module, from a first and a second video camera associated with the tunerless television device. A merged 3D video stream is created from the first 2D video stream and the second 2D video stream using a 3D video offload processing module operatively coupled to the camera interface module. The merged 3D video stream is sent to the wireless device using the wireless communication interface. This abstract is not to be considered limiting, since other embodiments may deviate from the features described in this abstract.

36 Claims, 12 Drawing Sheets

(56) References Cited

U.S. PATENT DOCUMENTS

| | | |
|---|---|---|
| 6,784,901 B1 | 8/2004 | Harvey et al. |
| 6,839,082 B2 | 1/2005 | Lee et al. |
| 7,873,848 B2 | 1/2011 | Nakahara et al. |
| 7,908,322 B2 * | 3/2011 | Eisenberg ............ 709/204 |
| 8,169,506 B2 | 5/2012 | Hayashi |
| 8,189,100 B2 | 5/2012 | Li et al. |
| 8,284,233 B2 * | 10/2012 | Bennett et al. ......... 348/14.1 |
| 2003/0156188 A1 | 8/2003 | Abrams |
| 2003/0202089 A1 | 10/2003 | Alhadef et al. |
| 2004/0207719 A1 * | 10/2004 | Tervo et al. ............ 348/14.02 |
| 2005/0138546 A1 | 6/2005 | AbiEzzi |
| 2006/0242678 A1 | 10/2006 | Kostadinovich |
| 2006/0285832 A1 | 12/2006 | Huang |
| 2007/0174876 A1 | 7/2007 | Maggio et al. |
| 2007/0279415 A1 | 12/2007 | Sullivan et al. |
| 2008/0049107 A1 | 2/2008 | Hii et al. |
| 2008/0100805 A1 | 5/2008 | Majumder et al. |
| 2008/0170806 A1 * | 7/2008 | Kim ..................... 382/285 |
| 2008/0256591 A1 | 10/2008 | Li |
| 2009/0046138 A1 | 2/2009 | AbiEzzi |
| 2009/0172746 A1 | 7/2009 | Aldrey et al. |
| 2009/0228945 A1 | 9/2009 | Yaussy |
| 2009/0237495 A1 | 9/2009 | Kawahara |
| 2009/0244023 A1 * | 10/2009 | Kim et al. .............. 345/173 |
| 2010/0007716 A1 | 1/2010 | Lee et al. |
| 2010/0260426 A1 | 10/2010 | Huang et al. |
| 2012/0007943 A1 | 1/2012 | Tytgat |

FOREIGN PATENT DOCUMENTS

| | | |
|---|---|---|
| KR | 10-2006-0020435 | 3/2006 |
| WO | WO 00/60849 | 10/2000 |
| WO | WO 2006/121365 | 11/2006 |
| WO | WO 2007/136167 | 11/2007 |

OTHER PUBLICATIONS

Tamura et al (Stereoscopic Video Movie Camera Using 300K Pixel IT-CCD Sensors, IEEE 1991).*

Potter, Brittany, USPTO, Office Action U.S. Appl. No. 12/661,371, Dated Dec. 5, 2012.

International Search Report and Written Opinion, (Related Application) PCT/US2010/053759, Jun. 24, 2011.

"MSN TV 2 Takes You to the Future of TV: Review," posted by Fabien Montique, MSN TV website, Jan. 21, 2006.

"Minoru 3D Webcam," Firebox website, 2009.

"HYTEK General Stereo 3D Camera Driver," Hyteck Automation website, 2006.

"Personalized IPTV Services using Web-based Open Platform in NGN," Lee et al., Global Telecommunications Conference 2008.

* cited by examiner

AUTOMATED WIRELESS THREE-DIMENSIONAL (3D) VIDEO CONFERENCING VIA A TUNERLESS TELEVISION DEVICE

CROSS REFERENCE TO RELATED DOCUMENTS

This application claims priority to and claims the benefit of U.S. Provisional Application Ser. No. 61/258,997 filed on Nov. 6, 2009, entitled Sony NetTV: A Low Cost Purely Networked TV, which is hereby incorporated herein by reference; and this application is related to concurrently filed U.S. utility patent application Ser. No. 12/661,371, titled "THREE-DIMENSIONAL (3D) VIDEO FOR TWO-DIMENSIONAL (2D) VIDEO MESSENGER APPLICATIONS," which is incorporated herein by reference in its entirety.

COPYRIGHT AND TRADEMARK NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever. Trademarks are the property of their respective owners.

BACKGROUND

Television devices conventionally include a tuner for tuning and receiving audio and video content, a display for presenting the received video content, and speakers for presenting the received audio content. The tuner tunes to a television channel, either over the air or via satellite or cable connection.

BRIEF DESCRIPTION OF THE DRAWINGS

Certain illustrative embodiments illustrating organization and method of operation, together with objects and advantages may be best understood by reference to detailed description that follows taken in conjunction with the accompanying drawings in which.

DETAILED DESCRIPTION

Figure 1:
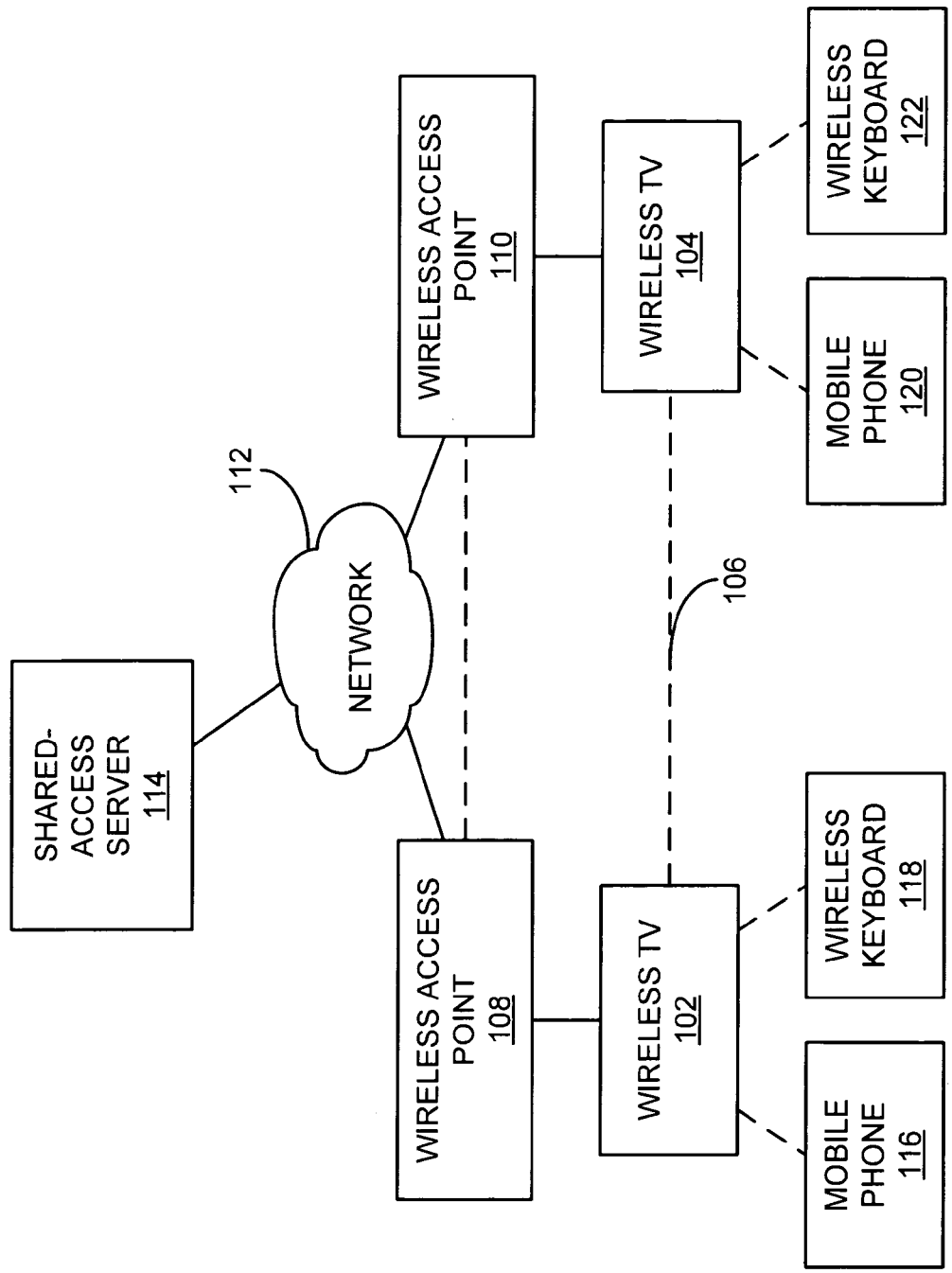
FIG. 1 is a block diagram of an example of an implementation of a system that provides automated wireless three-dimensional (3D) video conferencing via a tunerless television device consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "program" or "computer program" or similar terms, as used herein, is defined as a sequence of instructions designed for execution on a computer system. A "program," or "computer program," may include a subroutine, a function, a procedure, an object method, an object implementation, in an executable application, an applet, a servlet, a source code, an object code, a shared library/dynamic load library and/or other sequence of instructions designed for execution on a computer system having one or more processors.

Reference throughout this document to "one embodiment," "certain embodiments," "an embodiment," "an implementation," "an example" or similar terms means that a particular feature, structure, or characteristic described in connection with the example is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C." An exception to this definition will occur only when a combination of elements, functions, steps or acts are in some way inherently mutually exclusive.

The present subject matter provides automated wireless three-dimensional (3D) video conferencing via a tunerless television device. A 3D video conference may be automatically established via a wireless communication interface of the tunerless television device with a wireless device capable of 3D video conferencing. The 3D video conference may be wirelessly transported across a network, such as the Internet, or wirelessly transported between the tunerless television device and the wireless device in a point-to-point manner via a wireless mesh network or other point-to-point wireless connection. As such, the automated establishing of the 3D video conference may be used between 3D devices in different rooms of a house or other building, between a 3D device within a structure and a mobile 3D device, and between two mobile 3D devices.

Wireless devices may be authorized in advance for automated connection via 3D conferencing or may be authorized dynamically during other communications. The automated wireless three-dimensional (3D) video conferencing via a tunerless television device may be performed in response to events associated with the tunerless television device, and authorization may be either verified or obtained in associated with these events. For example, a 3D video conference may be automatically established in response to detection of a wireless device via a wireless communication interface that is within range of or otherwise accessible by the tunerless television device. Additionally, a 3D video conference may also be automatically established in response to detecting a request to initiate the 3D video conference via a user remote control device that identifies a selected contact from a contact list that is associated with a wireless device. Further, a 3D video conference may be automatically established in response to receiving a request to initiate an automated 3D video conference from a wireless device and determining that the wireless device is authorized for automated 3D video conferencing. A 3D video conference may also be automatically established in response to receiving a text message from the wireless device and determining that the text message is from a user within a contact list associated with the tunerless television device that is authorized for automated 3D video conferencing.

Alternatively, a 3D video conference may be automatically established in response to detecting a contact name selection from a contact list of 3D video conferencing contacts. In response to such a selection, a wireless device associated with the selected contact name and a wireless connection status of the wireless device may be determined. If text input associated with a text message is received from a wireless text input device, an automated 3D conference request text message may be sent to the wireless device in response to determining the wireless device is active. In such an implementation, a 3D video conference may be automatically established in response to receipt of a confirmation text message or other confirmation from the wireless device. Text input may be received wirelessly, such as via a wireless keyboard or a mobile phone, or may be received via a TV on-screen software keyboard, as appropriate for a given implementation.

Another example event includes searching, either at scheduled times or randomly, for wireless devices that are authorized for 3D video conferencing. In such an implementation, a 3D conference may be automatically established in response to determining that a wireless device is active and that it is authorized for automated 3D video conferencing. Many other examples of events for initiating automated 3D video conferencing are possible and all are considered within the scope of the present subject matter.

The tunerless television device may also provide wireless Internet access for the tunerless television device for access to movies, shows, and other internet content. Because the tunerless television device may access the Internet for content and provides a 3D communication platform for communication with friends and colleagues, a conventional tuner is not needed. Additionally, network cabling or other cabling connections to the tunerless television device for communication traffic and content access are not needed.

A default display screen may be provided via a display device of the tunerless television device that includes an option for 3D video conferencing. Requests to customize the default display screen with an Internet address for default access to content available via the Internet address may also be received and processed. In response to such a request, the Internet address may be added to the default display screen. As such, the default display screen is not a video feed from video sources, such as a cable or satellite provider. Instead, a customizable home page may be provided so that users may see their favorite video sites when the tunerless television device is turned on. Text-based content, such as headline news, social network feeds, text messages, and other text-based content may also be displayed as a top bar or a side bar, or in another configuration appropriate for a given implementation.

Social networking websites may be integrated as either a selectable item on the default display screen or may be selectable via navigation. Network users may share a link to personally shared content via their social networking page allowing other persons on their contact list to access the content with the help of a shared-access server. As such, a user of a tunerless television device may initiate an invitation to users of other wireless devices. Other standard social networking websites may be integrated as a social networking channel. Content providers may share movies or TV programs via the wireless networking capabilities of the tunerless television device and may generate advertizing data based on user's viewing habits.

The tunerless television device may also provide and utilize services from other wireless devices. For example, if either the tunerless television device, or a wireless device accessible by the tunerless television device, includes an Internet connection, that connection may be shared in the mesh network. This shared connection may be implemented either directly or through gateway nodes. Alternatively, if either such device has a local or Internet application installed, the device may share the application and the other such device may access the installed application. Additionally, the tunerless television device may allow other devices to access cameras used for 3D video generation, storage, or other available services. The tunerless television device may also retrieve telephone voice mails from wireless telephone answering devices or mobile phones.

The tunerless television device may also be used as an entertainment center of a home or other structure. The tunerless television device may be used to manage movies, photographs, music, and other content shared from other wireless devices and may provide users with a smooth unencumbered user interface for viewing, organizing, and searching such content residing in a network, such as a home network, or via the Internet.

The tunerless television device may implement personalized features, such as user profile management, to allow users to create multiple profile accounts on the tunerless television device. Customized user data, such as the default home screen, favorites, contact lists, and eWallet and other information, may be stored online in shared-access servers. Users may have the option to synchronize their favorite lists with their personal computers or other devices so that all personalized contents and links may be accessed from other locations. Enhanced parental control may be implemented to place access restrictions on certain content and websites for certain users.

While not a requirement of the present subject matter, it is understood that legacy 2D video messenger applications may be used for interaction between the tunerless television device and wireless devices for 3D video conferencing. Such legacy 2D video messenger applications send requests directed to a single camera device, such as a webcam, associated with a tunerless television device. The requests include requests such as camera open requests, camera close requests, set format requests, set parameter requests, frame buffer query requests, de-queue video requests, and other requests directed to the single camera device. Further, the program code associated with the instant 2D video messenger applications is proprietary and not available for modification. The present subject matter may utilize an existing legacy 2D video messenger application without requiring modification of this proprietary program code.

As such, the existing legacy 2D video messenger applications may continue to generate requests associated with a single video camera device without change. At a tunerless television device, a camera interface module (e.g., a device driver software or hardware module) is configured to receive requests associated with a single video camera from a legacy 2D video messenger application. The camera interface module is also configured to interface with two video cameras, rather than a single camera as expected by the legacy 2D video messenger application. Upon receipt of such a request from a legacy 2D video messenger application, the camera interface module generates camera control signals for each of the two video cameras. Video content is received from both video cameras and merged into 3D video content and returned in response to the request for video content from the single video camera received from the legacy 2D video messenger application. This 3D video content is delivered by the legacy 2D video messenger application to another tunerless television device without awareness that it may not be delivering 2D video content. At the tunerless television device that receives the 3D video content, post-processing is performed to render the 3D video content, again with no change to the existing legacy 2D video messenger application.

For implementations where kernel code space or execution occupancy is limited on the tunerless television device responsible for generating 3D video content, a video processing offload module is utilized to move the 3D processing and computational load to a user space application and/or a hardware module. As such, kernel code space and execution occupancy constraints for a processor operating the kernel code may be observed with increased 3D processing load capabilities offloaded to the 3D processing module.

For such an implementation, upon receipt of a request for video content from a single video camera, the camera interface module generates camera control signals based upon the request for video content from the single video camera to generate video content from a first video camera, forwards the request to the video processing offload module, and generates camera control signals to generate video content from the second video camera in response to receipt of the request from the video processing offload module. As such, the camera interface module identifies the request as a request for video content from a single video camera, processes the request via the video processing offload module, and controls generation of video content from both video cameras.

The video processing offload module receives the request for video content from the single video camera and sends the request for video content to the camera interface module. The camera interface module receives the request and generates camera control signals based upon that request for the second video camera. The camera interface module receives video content from each video camera and forwards the received video content from both video cameras to the video processing offload module. The video processing offload module merges the video content received from the first video camera and the video content received from the second video camera into three-dimensional (3D) video content. The video processing offload module sends the merged 3D video content to the legacy 2D video messenger application via the camera interface module. The legacy 2D video messenger application forwards the 3D video content to a receiving tunerless television device. That receiving tunerless television device identifies the received video content as 3D video content and post-processes the received 3D video content for rendering on a display associated with the receiving tunerless television device.

For purposes of the present subject matter, it is understood that several forms of 3D content are presently available. For example, 3D video content may be encoded for polarized, frame sequential, or 3D-capable display output devices. For polarized encoding, 3D video content may be generated by merging left and right images in either a side-by-side or top-and-bottom format on each frame of video content. At rendering, these images are scaled and formatted with opposite circular polarization onto odd and even lines of each displayed video frame, respectively. Passive polarized 3D glasses are used to present the left and right eye images to the viewer. Alternatively, a frame sequential format operating at twice the frame rate of polarized encoding may be used such that each of the left and right images is sequentially rendered. Active 3D glasses are used to synchronize with and select which lens is active for each sequential frame. Resolution of 3D imaging may be compromised using either of the described 3D encoding and rendering options. Alternatively, 3D-capable displays are available that perform the conversion of 3D video content to a 3D rendered output and may have a higher rendering resolution for 3D content than either of the approaches that use passive or active glasses. It should be understood that the present subject matter applies to the above-described and any other 3D video content encoding and rendering formats. It is also understood that a person of ordinary skill in the art would be able to implement the present subject matter based upon the present description. As such, further details of 3D encoding and rendering will not be described herein.

It is also understood that 3D calibration and 3D rectification activities may be performed to align the merged left and right images. The 3D calibration may be performed by detecting an edge and a corner of an image held in front of the cameras that generate the left and right images. The 3D rectification may be performed by estimating a positional relationship between the cameras that generate the left and right images. At least one of the left and right images may be adjusted based upon the estimated positional relationship between the cameras by obtaining warping matrixes to be applied to the images and applying the warping matrixes to the left and right images received from the two video cameras. It is understood that a person of ordinary skill in the art would be able to calibrate and rectify images as described herein based upon the description of the present subject matter contained herein.

Turning now to FIG. 1, FIG. 1 is a block diagram of an example of an implementation of a system 100 that provides automated wireless three-dimensional (3D) video conferencing via a tunerless television device. A wireless television (TV) 102 communicates with a wireless TV 104 via one of several wireless connections. The wireless TV 102 may communicate with a wireless TV 104 via a wireless mesh connection 106. The wireless TV 102 may also communicate with the wireless TV 104 via a wireless access point 108. The wireless access point 108 may either be in direct communication with a wireless access point 110 or may communicate with the wireless access point 110 via a network 112. The wireless TV 102 and the wireless TV 104 may also communicate with a shared-access server 114 via the network 112.

The shared-access server 114 provides storage and download access capabilities for information, content, and other shared resources that are available to the wireless TV 102 and the wireless TV 104. The shared-access server 114 may also store a legacy 2D video messenger application for use during video conferencing. As described above, and in more detail below, the wireless TV 102 and the wireless TV 104 may utilize the legacy 2D video messenger application to transport 3D video content during video conferences without requiring a change to operational code associated with the legacy 2D video messenger application.

Upon download and installation of the legacy 2D video messenger application by each of the wireless TV 102 and the wireless TV 104, the 2D video messenger application provides either peer-to-peer interconnection or server-controlled interconnection capabilities, based upon the given implementation, for video conferencing between the wireless TV 102 and the wireless TV 104. For the peer-to-peer implementation, the installed 2D video messenger application on either of the wireless TVs 102 and 104 may initiate a video conference session and messages may be forwarded to the other wireless TV via the network 112. For the server-controlled implementation, the shared-access server 114 may communicate with the installed 2D video messenger application to receive and forward all messages associated with a video conference between the wireless TV 102 and the wireless TV 104.

While the example described above utilizes the legacy 2D video messenger application, it should be understood that alternative communications may be implemented. For example, direct communications for 3D video conferencing may be performed over the wireless mesh connection 106, or otherwise. Such an implementation may include an embedded or other video messenger application appropriate for communication between the devices. Accordingly, any such alternative is considered within the scope of the present subject matter and the present subject matter is not limited to use of a legacy 2D video messenger application.

As described in more detail below, both the wireless TV 102 and the wireless TV 104 are configured for generation of 3D video. It is also understood that both the wireless TV 102 and the wireless TV 104 may be configured to identify received 3D content and render that 3D content to a user of the respective wireless TV. It should further be noted that either the wireless TV 102 or the wireless TV 104 may communicate with wireless TVs that have only one camera for outgoing video generation. In such a situation, such a device may be configured to process received 3D video for 2D video messenger applications associated with the present subject matter.

A mobile phone 116 and a wireless keyboard 118 are associated with the wireless TV 102, and provide text input capabilities for the wireless TV 102. A mobile phone 120 and a wireless keyboard 122 are associated with the wireless TV 104, and provide text input capabilities for the wireless TV 104. As will be described in detail below beginning with FIG. 3, a remote control device tailored to the wireless TV 102 and/or the wireless TV 104 may also be used to enter text via a TV on-screen software keyboard, as appropriate for a given implementation.

The shared-access server 114 may be any network-based or web-based server accessible via the network 112. Examples of web-based servers that are presently within the marketplace and that provide 2D video messenger applications are Yahoo® Messenger servers, Google Talk® servers, and Skype® servers. Many other network accessible web-based servers exist and many others are contemplated by the present subject matter. Accordingly, all such network-accessible web-based servers are considered within the scope of the present subject matter.

The network 112 may include any form of interconnection suitable for the intended purpose, including a private or public network such as an intranet or the Internet, respectively, direct inter-module interconnection, dial-up, wireless, or any other interconnection mechanism capable of allowing communication between devices. An example of a web-based protocol suitable for providing communication over the network 112 is the transmission control protocol over Internet protocol (TCP/IP). Markup language formatting, such as the hypertext transfer protocol (HTTP) and extensible markup language (XML) formatting, may be used for messaging over the TCP/IP connection with devices accessible via the network 112. Other web protocols exist and all are considered within the scope of the present subject matter.

For purposes of the present description, the term "real time" shall include what is commonly termed "near real time"—generally meaning any time frame of sufficiently short duration as to provide reasonable response time for on-demand information processing acceptable to a user of the subject matter described (e.g., within a few seconds or less than ten seconds or so in certain systems). These terms, while difficult to precisely define are well understood by those skilled in the art. It is further understood that the subject matter described herein may be performed in real time and/or near real time.

Figure 2:
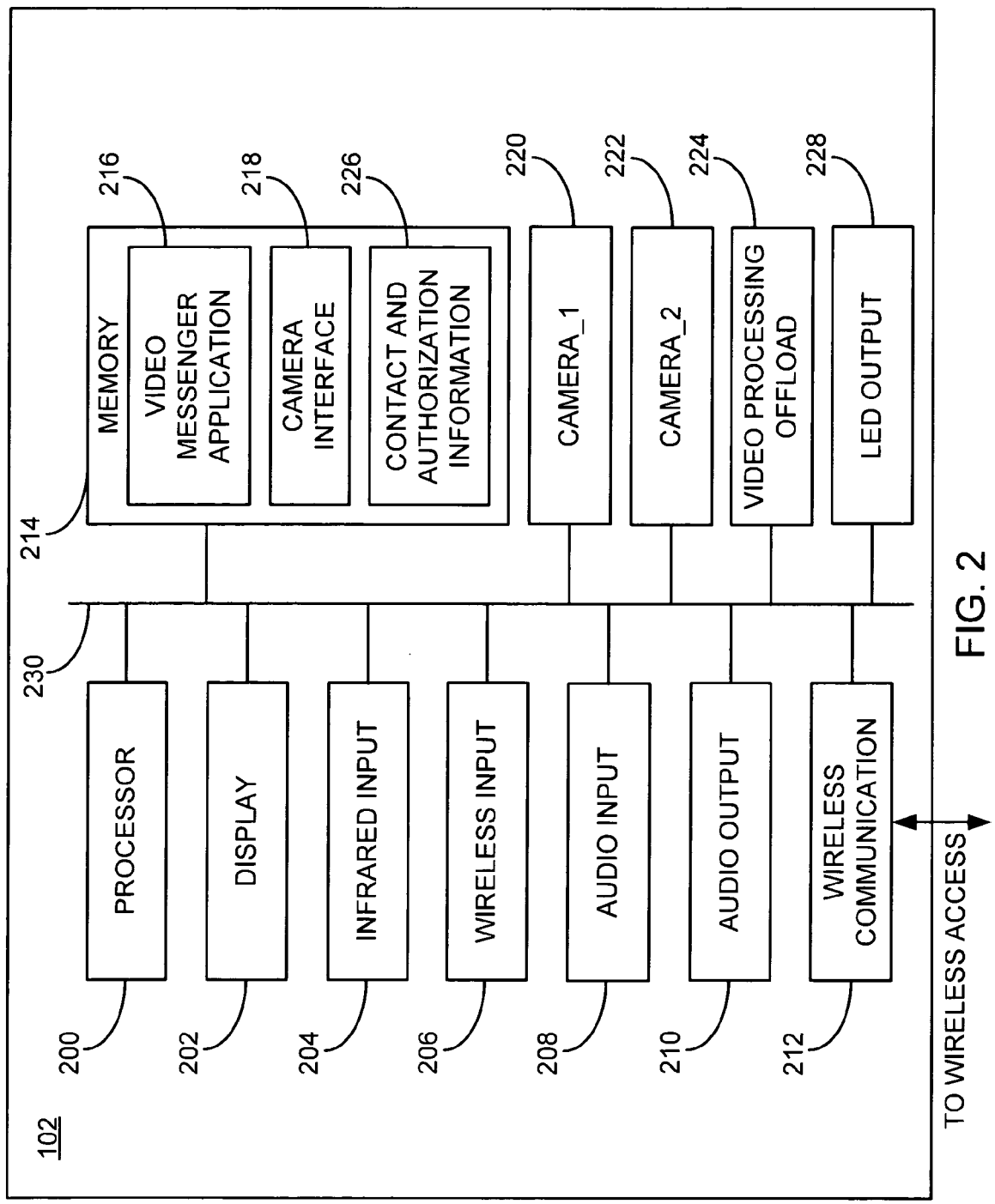
FIG. 2 is a block diagram of an example of an implementation of a wireless television (TV) that provides automated wireless 3D video conferencing consistent with certain embodiments of the present invention.

FIG. 2 is a block diagram of an example of an implementation of the wireless TV 102 that provides automated wireless three-dimensional (3D) video conferencing via a tunerless television device. It is understood that the present description of the wireless TV 102 also applies to the wireless TV 104. However, as described above, either the wireless TV 102 or the wireless TV 104 may communicate and video conference with wireless TVs that have only one camera for outgoing video generation. In such a situation, such a device may be configured to process received 3D video for 2D video messenger applications associated with the present subject matter.

A processor 200 provides computer instruction execution, computation, and other capabilities within the wireless TV 102. A display device 202 provides visual and/or other information to a user of the wireless TV 102. The display device 202 may include any type of display device, such as a cathode ray tube (CRT), liquid crystal display (LCD), light emitting diode (LED), projection or other display element or panel. An infrared input device 204 provides input capabilities for the user of the wireless TV 102 via a device, such as an infrared remote control (See FIG. 3). A wireless input device 206 provides input capabilities for the user of the wireless TV 102 via wireless devices, such as the mobile phone 116 and the wireless keyboard 118. Wireless devices for input may also include a mouse, pen, trackball, or other input device. One or more wireless input devices, such as the mobile phone 116 and the wireless keyboard 118, may be used.

An audio input device 208 provides audio input capabilities to capture audio inputs, such as speech and verbal communication associated with a video conference, from a user of the wireless TV 102. The audio input device 208 may include a microphone, driver circuitry, and interface circuitry as appropriate for a given implementation. An audio output device 210 provides audio output capabilities for the wireless TV 102, such as verbal communication associated with a video conference. The audio output device 210 may include a speaker, driver circuitry, and interface circuitry as appropriate for a given implementation.

A wireless communication module 212 provides wireless communication capabilities for interaction with the wireless TV 104 and the shared-access server 114 for downloading and installing the 2D video messenger application, for communicating during a video conference with the respective device(s) using such an application, for accessing shared applications or social networking content, and other activities as appropriate for a given implementation. The wireless communication module 212 may support wireless standards appropriate for a given implementation. Example wireless standards include cellular wireless communication and Bluetooth® wireless communication standards. Many other wireless communication standards are possible and all are considered within the scope of the present subject matter.

It should be noted that the wireless communication module 212 is illustrated as a component-level module for ease of illustration and description purposes. It is also understood that the wireless communication module 212 may include any hardware, programmed processor(s), and memory used to carry out the functions of the wireless communication module 212. For example, the wireless communication module 212 may include additional controller circuitry in the form of application specific integrated circuits (ASICs), processors, and/or discrete integrated circuits and components for performing electrical control activities associated with the wireless communication module 212. Additionally, the wireless communication module 212 may include interrupt-level, stack-level, and application-level modules as appropriate. Furthermore, the wireless communication module 212 may include any memory components used for storage, execution, and data processing by these modules for performing processing activities associated with the wireless communication module 212. The wireless communication module 212 may also form a portion of other circuitry described below without departure from the scope of the present subject matter.

A memory 214 includes a video messenger application 216. The video messenger application 216 may be a legacy 2D video messenger application, as described above, or may be an embedded or other video messenger application without departure from the scope of the present subject matter. For an implementation with a legacy 2D video messenger application, the video messenger application 216 represents an application downloaded and installed from the shared-access server 114, as described above, for 2D video messaging.

The memory 214 also includes a camera interface module 218. The camera interface module 218 includes driver and communication capabilities for interfacing the wireless TV 102 with a camera_1 220 and a camera_2 222 (described below). The camera interface module 218 receives requests for content and other actions associated with the camera_1 220 and the camera_2 222 and controls generation of 3D video content in conjunction with a video processing offload module 224 (described below).

The memory 214 further includes a contact and authorization information storage area 226. The contact and authorization information storage area 226 stores information, such as contact lists, address books, user and/or communication preference profiles for 3D video conferencing and social networking, and authorization information for automated 3D video conferencing as described herein. Other information may be stored in the contact and authorization information storage area 226 without departure from the scope of the present subject matter.

It is understood that the memory 214 may include any combination of volatile and non-volatile memory suitable for the intended purpose, distributed or localized as appropriate, and may include other memory segments not illustrated within the present example for ease of illustration purposes. For example, the memory 214 may include a code storage area, a code execution area, and a data area suitable for storage of the information and storage and execution of the respective applications and any firmware associated with a programmed processor that forms a portion of other components associated with the wireless TV 102, as appropriate. It is also understood that other information may also be stored within the memory 214 as appropriate for a given implementation without departure from the scope of the present subject matter.

The wireless TV 102 includes a camera_1 220 and a camera_2 222. The camera_1 220 and the camera_2 222 may be any form of camera suitable for the intended implementation. For example, the cameras 220 through 222 may include a webcam or other camera suitable for use for capturing images at the respective computing devices.

The wireless TV 102 also includes a light emitting diode (LED) output module 228. The LED output module 228 provides one or more output LEDs and associated driver circuitry for signaling certain events or acknowledgements to a user of the wireless TV 102. Many possibilities exist for communicating information to a user via LED signaling and all are considered within the scope of the present subject matter.

As described in more detail below, the camera interface module 218 also interfaces with the video messenger application 216 to provide appropriate interface signaling for the video messenger application 216. Upon receipt of signaling and/or requests from the video messenger application 216 directed to a single video camera, the camera interface module 218 generates control signals based upon the signaling and/or requests directed to the single video camera and directs those control signals, as described in more detail below, to both of the camera_1 220 and the camera_2 222 to provide a two-camera interface for the wireless TV 102. The video content received from both of the camera_1 220 and the camera_2 222 is combined to form 3D video content. The 3D video content is returned to the video messenger application 216 in response to the signaling and/or requests directed to a single video camera. As such, for implementations where the video messenger application 216 is implemented as a legacy 2D video messenger application, the camera interface module 218 provides an interface that allows the wireless TV 102 to provide 3D video over the existing video messenger application 216 without requiring a change to the existing video messenger application 216.

The camera interface module 218 includes instructions executable by the processor 200 for performing these and other functions. The camera interface module 218 may form a portion of an interrupt service routine (ISR), a portion of an operating system, or a portion of a separate application without departure from the scope of the present subject matter.

It should be noted that the present example describes the camera interface module 218 in operation as a low-level driver. As such, the camera interface module 218 may be considered a driver and may be considered part of a kernel space for operations performed by the processor 200. To limit processing burden on the kernel space of the processor 200, the 3D video processing of the wireless TV 102 is performed outside of the kernel space of the processor 200.

The video processing offload module 224 provides the 3D video processing capabilities for the wireless TV 102 associated with the present subject matter. As described in more detail below, the camera interface module 218 forwards certain signaling and/or requests that are originated by the video messenger application 216 to the video processing offload module 224. The video processing offload module 224 responds to those requests and directs them to the camera_1 220 and the camera_2 222, via the camera interface module 218. The video processing offload module 224 receives video output and responses to signaling and/or requests from the camera_1 220 and the camera_2 222 and creates 3D video or combined responses to the signaling and/or requests and returns them to the video messenger application 216 via the camera interface module 218.

While the present examples described above and in more detail below depict certain signaling interconnections for ease of description purposes, it is understood that different signaling interconnections may be used without departure from the scope of the present subject matter. For example, the present examples are described with the camera interface module 218 receiving incoming requests from the video messenger application 216, generating control signals for the first camera_1 220, and routing the requests to the video processing offload module 224. The video processing offload module 224 forwards the requests back to the camera interface module 218, and the camera interface module 218 generates control signals for the second camera_2 222. However, this should not be considered limiting. While the present examples are described with the video processing offload module 224 routing all signaling through the camera interface module 218 to the camera_1 220 and the camera_2 222, the video processing offload module 224 may directly interface with the camera_1 220 and the camera_2 222 without departure from the scope of the present subject matter. Many other variations are possible and all are considered within the scope of the present subject matter.

It should be noted that the video processing offload module 224 is illustrated as a component-level module for ease of illustration and description purposes. It is also understood that the video processing offload module 224 may include any hardware, programmed processor(s), and memory used to carry out the functions of the video processing offload module 224 as described above and in more detail below. For example, the video processing offload module 224 may include additional controller circuitry in the form of application specific integrated circuits (ASICs), processors, and/or discrete integrated circuits and components for performing electrical control activities associated with the video processing offload module 224. Additionally, the video processing offload module 224 may include interrupt-level, stack-level, and application-level modules as appropriate. Furthermore, the video processing offload module 224 may include any memory components used for storage, execution, and data processing for performing processing activities associated with the video processing offload module 224.

It should be noted that the video processing offload module 224 may also form a portion of other circuitry described below without departure from the scope of the present subject matter. Further, the video processing offload module 224 may alternatively be implemented as an application stored within the memory 214. In such an implementation, the video processing offload module 224 may include instructions executed by the processor 200 for performing the functionality described herein. The processor 200 may execute these instructions to provide the processing capabilities described above and in more detail below for the wireless TV 102. The video processing offload module 224 may form a portion of an interrupt service routine (ISR), a portion of an operating system, or a portion of a separate application without departure from the scope of the present subject matter.

The processor 200, the display device 202, the infrared input device 204, the wireless input device 206, the audio input device 208, the audio output device 210, the wireless communication module 212, the memory 214, the camera_1 220, the camera_2 222, the video processing offload module 224, and the LED output module 228 are interconnected via one or more interconnections shown as interconnection 230 for ease of illustration. The interconnection 230 may include a system bus, a network, or any other interconnection capable of providing the respective components with suitable interconnection for the respective purpose.

Furthermore, components within the wireless TV 102 may be co-located or distributed within a network without departure from the scope of the present subject matter. For example, the components within the wireless TV 102 may be located within a stand-alone device. For a distributed arrangement, the display device 202, the infrared input device 204, and the camera_1 220 and camera_2 222 may be located at a kiosk, while the processor 200, the memory 214, and the wireless input device 206 may be located at a local or remote server or in an adjacent room of a building. Many other possible arrangements for the components of the wireless TV 102 are possible and all are considered within the scope of the present subject matter.

Figure 3:
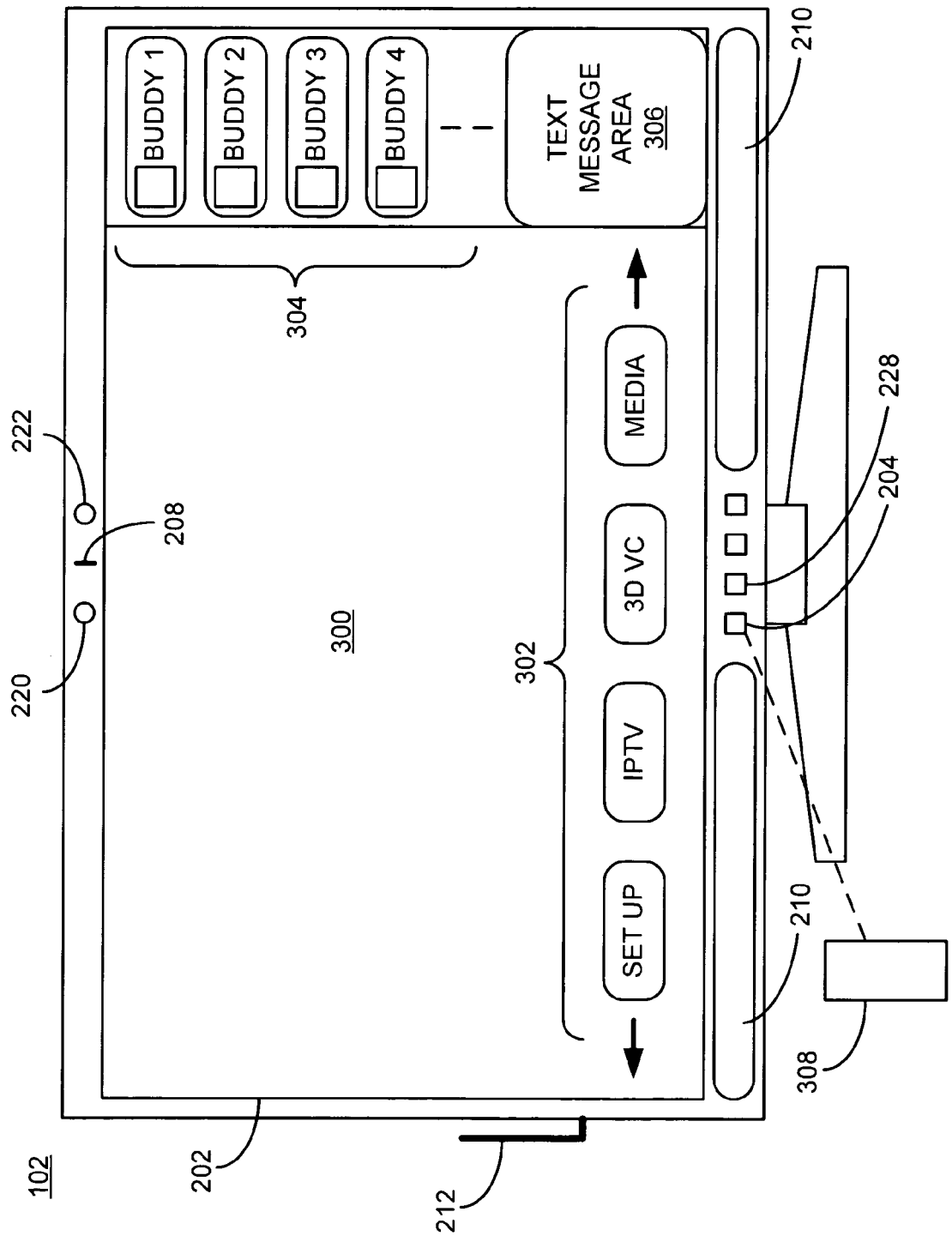
FIG. 3 is a diagram of an example of an implementation of the wireless TV including a customizable graphical user interface (GUI) for providing automated wireless 3D video conferencing consistent with certain embodiments of the present invention.

FIG. 3 is a diagram of an example of an implementation of the wireless TV 102 including a customizable graphical user interface (GUI) 300 for providing automated wireless three-dimensional (3D) video conferencing via a tunerless television device. The respective elements shown in FIG. 3 that were described above in association with FIG. 2 are not described again below for ease of description, but are referenced by the same reference numerals as shown in FIG. 2.

The customizable GUI 300 includes a rotatable menuing interface 302. The rotatable menuing interface 302 is customizable and selection elements may be added to or removed from the rotatable menuing interface 302. Current selection options shown include a "Set Up" option, an Internet Protocol TV ("IPTV") option, a 3D video conferencing ("3D VC") option, and a "Media" option. Many other possibilities exist for selection options for the rotatable menuing interface 302 and all are considered within the scope of the present subject matter.

The Set Up option allows setup and configuration of the wireless TV 102. The IPTV option allows access to IP TV content selections via the network 112 from the shared-access server 114. The 3D VC option allows access to configuration and control selections for 3D video conferencing, including configuration and control selections for automated 3D video conferencing as described herein. The Media option allows access to selections of content stored either locally or shared content selections associated with other devices accessible by the wireless TV 102, such as the wireless TV 104.

A contact list area 304 includes contacts (e.g., Buddies) from a contact list or address book, as described above. As also described above and in more detail below, selection of a contact from the contact list area 304 may initiate automated 3D video conferencing with the selected contract. Additionally, sending or receiving a message, such as a text message, to or from a contact that is authorized for automated 3D video conferencing may initiate a 3D video conference. Initiation of a 3D video conference may be based upon configured options associated with each such contact.

A text message area 306 provides a display area for input of text for text messaging and for display of received text messages. As such, text messaging may be performed during 3D video conferencing. The text messaging may be performed with one or more persons associated with an active 3D video conference, or may be performed with another contact from the contact list. Further, text messaging content may be displayed in the text message area 306 in response to receipt or a text message from someone that is not in the contact list and input of text and a wireless device identifier (e.g., wireless telephone number) associated with someone that is not in the contact list may initiate a text message to that wireless device. Many other possibilities exist for text messaging in association with 3D video conferencing and all are considered within the scope of the present subject matter.

A 3D video conferencing wireless remote control device 308 is shown. The 3D video conferencing wireless remote control device 308 provides features associated with 3D video conferencing in addition to control of the wireless TV 102. The 3D video conferencing wireless remote control device 308 is described in more detail below in association with FIG. 4.

Figure 4:
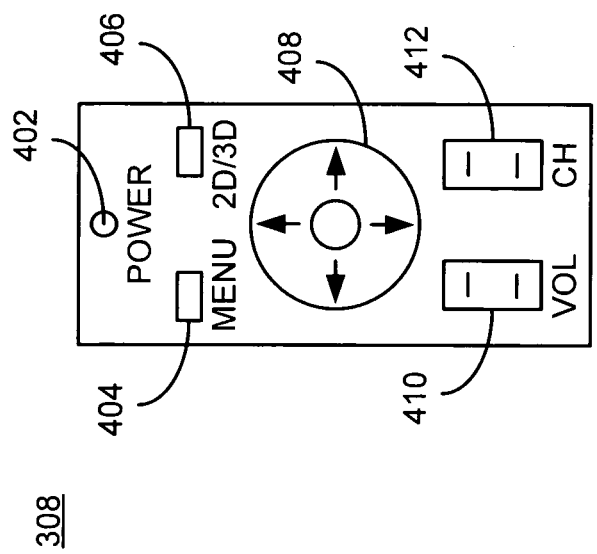
FIG. 4 is a diagram of an example of an implementation of a 3D conferencing wireless remote device for controlling a wireless TV device for performing automated wireless 3D video conferencing consistent with certain embodiments of the present invention.

FIG. 4 is a diagram of an example of an implementation of the 3D video conferencing wireless remote control device 308 for controlling a wireless TV device, such as the wireless TV 102, and for performing automated wireless three-dimensional (3D) video conferencing via a tunerless television device. The 3D video conferencing wireless remote control device 308 includes a power button 402, a menu button 404, a 2D/3D button 406, a navigation control 408, a volume control 410, and a channel control 412.

The power button 402 provides control for wirelessly turning the wireless TV 102 on and off. The menu button 404 allows wireless control of display of the rotatable menuing interface 302. The 2D/3D button 406 allows wireless control of transitioning between two-dimensional and three-dimensional video conferencing. For example, if a wireless device in communication with the wireless TV 102 does not support 3D output, the user may toggle the output of the wireless TV 102 to a 2D output mode. As such, the 2D/3D button 406 provides wireless control over the video output format of the wireless TV 102. The navigation control 408 allows wireless navigation within the customizable GUI 300. The volume control 410 allows wireless control of volume adjustment for the wireless TV 102. The channel control 412 allows wireless control of IP TV content selections. As such, the 3D video conferencing wireless remote control device 308 provides a set of controls that support the features of the wireless TV 102.

Figure 5:
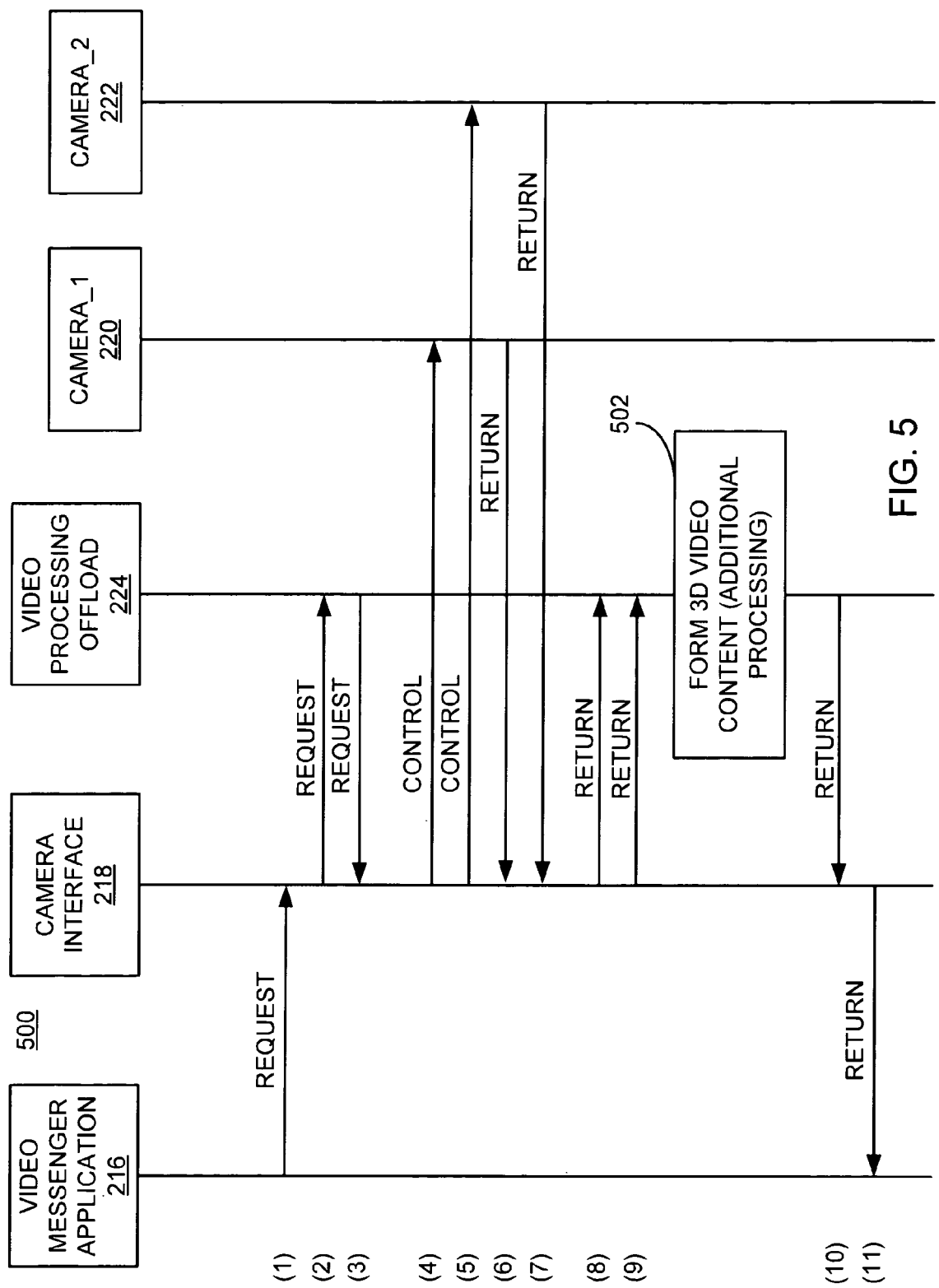
FIG. 5 is a message flow diagram of an example of an implementation of a message and video content message flow for providing automated wireless 3D video conferencing via a tunerless television device consistent with certain embodiments of the present invention.

FIG. 5 is a message flow diagram of an example of an implementation of a message and video content message flow 500 for providing automated wireless three-dimensional (3D) video conferencing via a tunerless television device. As described above and in more detail below, the automated wireless three-dimensional (3D) video conferencing via a tunerless television device may be performed by a device, such as the wireless TV 102 and may be initiated in response to a variety of events. The example of FIG. 5 assumes that an external event has initiated communication with the wireless TV 102 and that a first request for video content is received via the video messenger application 216. However, it is understood that alternative message flow diagrams may be created for any automated 3D video conferencing implementation within the scope of the present subject matter. These additional message flows are not illustrated for brevity. As such, any and all such message flow diagrams and messaging interactions are considered within the scope of the present subject matter.

The video messenger application 216 sends a request for video content from a single video camera to the camera interface module 218 (line 1). In response to receipt of the request for video content from a single video camera, the camera interface module 218 forwards the request to the video processing offload module 224 (line 2). In response to receipt of the request, the video processing offload module 224 sends the same request back to the camera interface module 218 (line 3).

In response to receipt of the request from the video processing offload module 224, the camera interface module 218 generates control information and commands (e.g., control signals) and sends the generated control information and commands to the camera_1 220 and the camera_2 222 (lines 4 and 5, respectively). The camera_1 220 and the camera_2 222 process the respective control information and commands, and return video content to the camera interface module 218 (lines 6 and 7, respectively).

The camera interface module 218 returns the video content received from the camera_1 220 and the camera_2 222 to the video processing offload module 224 for processing (lines 8 and 9, respectively). In response to receipt of the video content, the video processing offload module 224 forms 3D video content and performs any additional processing at block 502.

As discussed above and in more detail below, the video processing offload module 224 may perform any 3D formatting appropriate for a given implementation. Additionally, the video processing offload module 224 may perform visual affects to change the resulting merged 3D video content. Changing the video content may include changing a portion of a first video content received from the first video camera, camera_1 220, and a portion of a second video content received from the second video camera, camera_2 222. As such, a change to the 3D video content may be made by changing portions of the individual video content received from each of the cameras. A request to change the video content may be received either from a user interface or via a network connection from another wireless TV. The request to change a portion of the merged 3D video content may include a request to smooth a facial feature of an image of a person, a request a thin a face or body image of a person, a request to stretch a portion of any image, or any other change to the merged 3D video content. As such, the video processing offload module 224 may perform image enhancement and image changes to the merged 3D video content for practical and entertainment purposes.

In response to receipt of a request to change a portion of the merged 3D video content, the video processing offload module 224 may detect the portion of the merged 3D video content within each of the first content received from the first video camera, camera_1 220, and may detect the portion of the merged 3D video content within each of the second content received from the second video camera, camera_2 222. In response to detecting the portion of the merged 3D video content to be changed within each of the respective video content, the video processing offload module 224 may change the requested portion of the video content. It should also be noted, that the change to the merged 3D video content may be performed either prior to or after the two video content elements have been merged, as appropriate for a given implementation.

Upon completion of the processing of the returned video content to form the merged 3D video content and any additional processing at block 502, the video processing offload module 224 returns the merged 3D video content to the camera interface module 218 (line 10). The camera interface module 218 then returns the merged 3D video content to the video messenger application 216 (line 11). As such, the camera interface module 218 and video processing offload module 224 provide automated 3D video for 2D video messenger applications. Further, the existing video messenger application 216 does not need to be changed.

Figure 6:
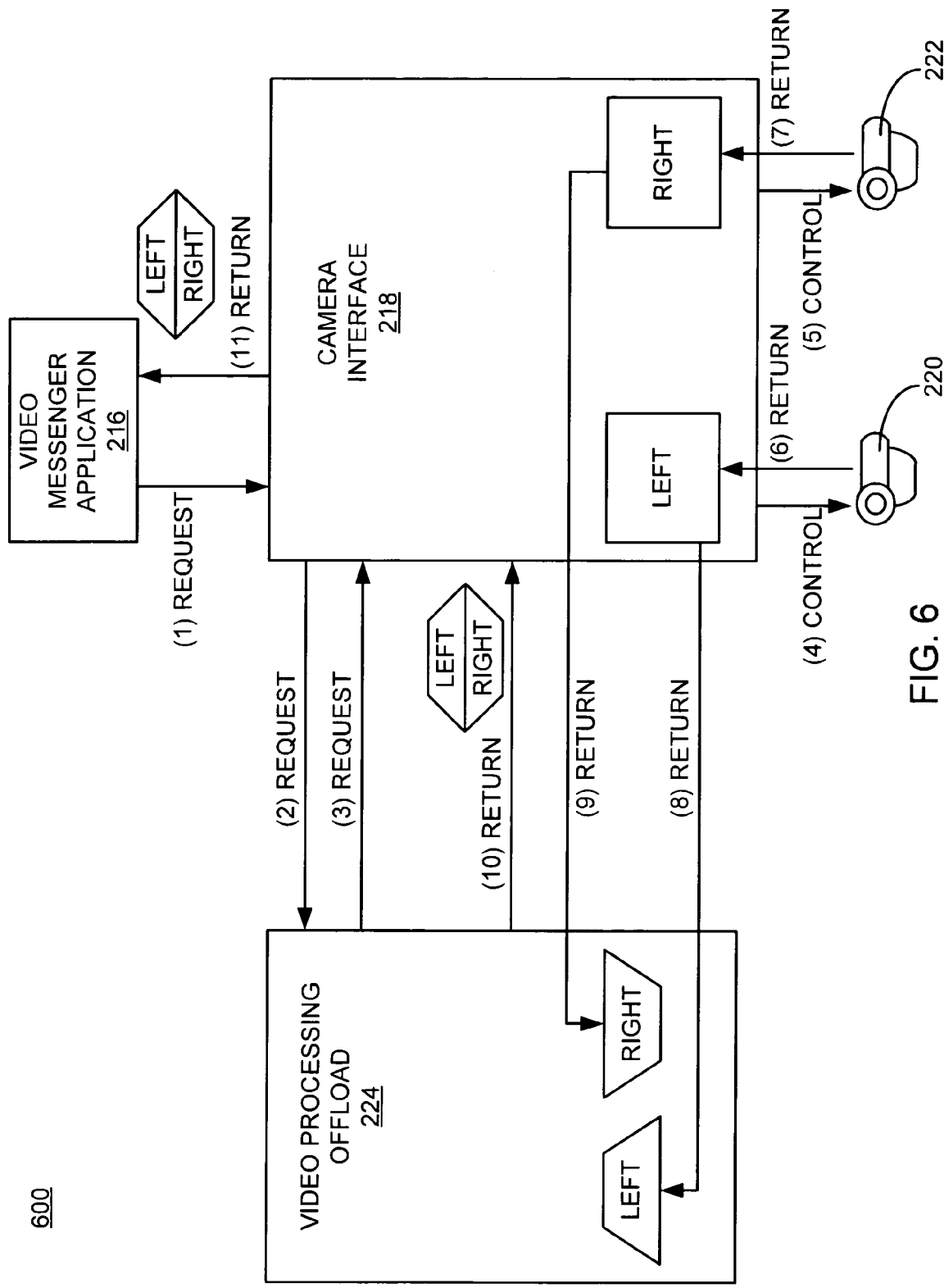
FIG. 6 is a message and video content flow architectural diagram of an example of an implementation of the message and video content flow of FIG. 5 within the architecture of a wireless TV consistent with certain embodiments of the present invention.

FIG. 6 is a message and video content flow architectural diagram of an example of an implementation of a message and video content flow 600 of FIG. 5 within the architecture of the wireless TV 102. As can be seen from FIG. 6, the line numbers that reference the messages and content return paths within FIG. 5 are maintained within FIG. 6 for ease of representation. The description of the messages and content return paths, as described above, is incorporated by reference with respect to the description of FIG. 6. It should be noted within FIG. 6 that the camera_1 220 and the camera_2 222 are represented as returning left and right video content, respectively, for the video content returned to the camera interface module 218. Further, the left and right video content is returned to the video processing offload module 224 (lines 8 and 9, respectively, within both FIG. 5 and FIG. 6). The merged 3D video content is shown returned via the camera interface module 218 to the video messenger application 216 (lines 10 and 11, respectively, within both FIG. 5 and FIG. 6). As such, the message and video content flow architectural diagram 600 provides a mapping of the message flow of FIG. 5 onto the architecture of the wireless TV 102.

Figure 7:
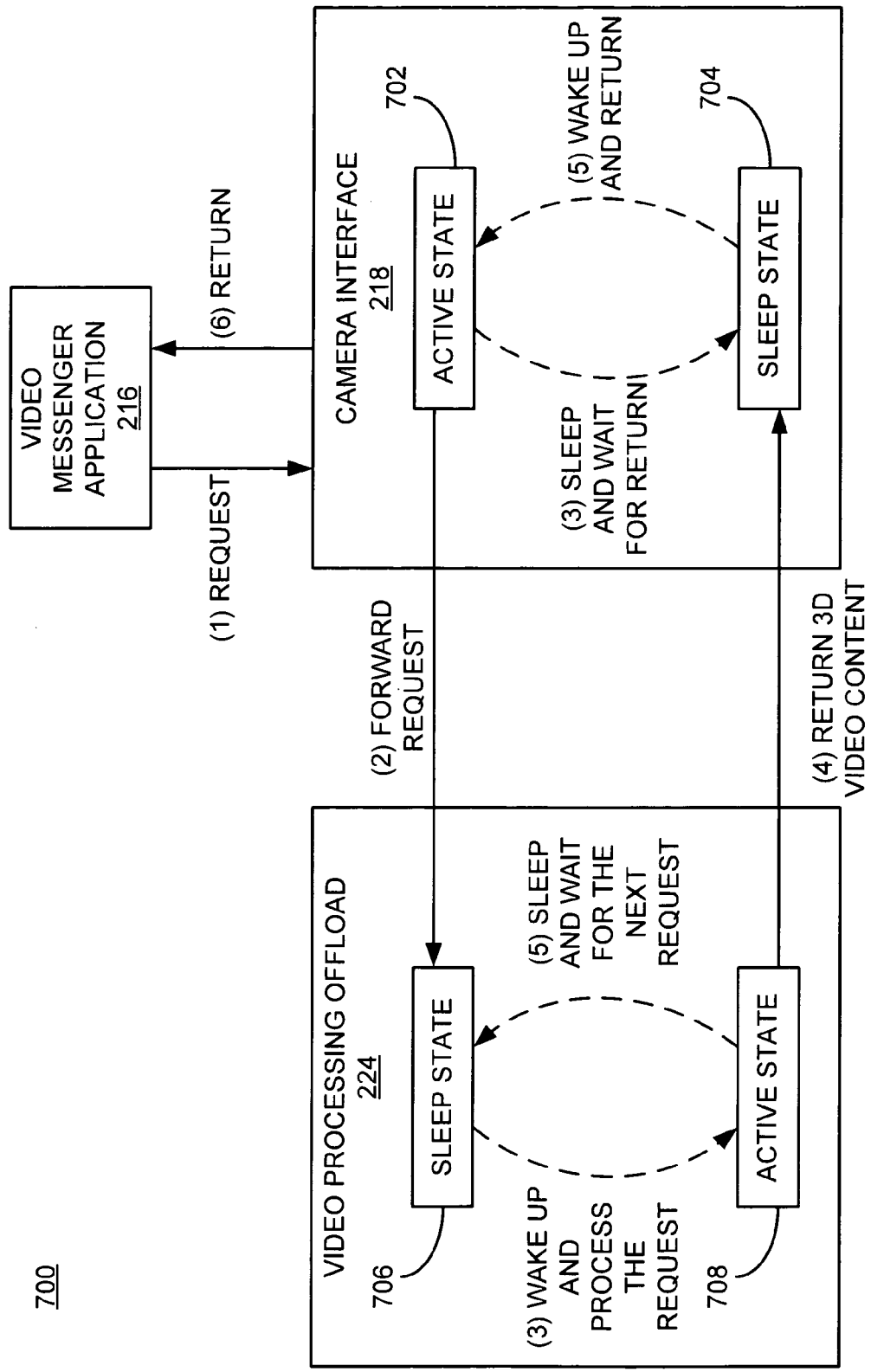
FIG. 7 is an architectural state diagram of an example of an implementation of a state-oriented process for automated wireless 3D video conferencing via a tunerless television device consistent with certain embodiments of the present invention.

FIG. 7 is an architectural state diagram of an example of an implementation of a state-oriented process 700 for automated wireless three-dimensional (3D) video conferencing via a tunerless television device. FIG. 7 also shows the video messenger application 216, the camera interface module 218, and the video processing offload module 224. It should be noted that the messaging and state transition sequence numbers of FIG. 7 do not necessarily map to the line numbers of FIG. 5 and FIG. 6.

Upon receipt of a request for video content from the video messenger application 216, the camera interface module 218 enters an active state at 702. As described above, the camera interface module 218 forwards the request to the video processing offload module 224 (line 2). The camera interface module 218 transitions from the active state at 702 to a sleep state at 704 and waits for return of 3D video content (dashed line 3 within the camera interface module 218).

In response to receipt of the forwarded request, the video processing offload module 224 transitions from a sleep state at 706 to an active state at 708 (e.g., wakes up) to process the received request (dashed line 3 within the video processing offload module 224). The video processing offload module 224 processes left and right video content received from the camera_1 220 and the camera_2 222, respectively (as illustrated in FIG. 6), and merges the two into the 3D video content.

The video processing offload module 224 returns the 3D video content to the camera interface module 218 (line 4). The video processing offload module 224 then transitions from the active state at 708 to the sleep state at 706 to await a new request (dashed line 5 within the video processing offload module 224).

In response to receipt of returned 3D video content, the camera interface module 218 transitions from the sleep state at 704 to the active state at 702 (e.g., wakes up, dashed line 5 within the camera interface module 218). The camera interface module 218 returns the 3D video content to the video messenger application 216 (line 6).

As such, processing of requests for video content between the camera interface module 218 and the video processing offload module 224 may be stateful (e.g., state-oriented) to allow each module to enter a sleep state upon completion of its respective processing and to transition back to an active state upon receipt of the returned 3D video content or a forwarded request for video content, respectively.

It should be noted that certain additional processing described above in other examples has been omitted from the description of FIG. 7 for ease of description purposes. However, it is understood that such additional processing may be performed without departure from the scope of the present subject matter as appropriate for a given implementation.

Based upon the message flows and architectural diagrams described above, the following additional examples of message flows and events may be applied by the camera interface module 218 in conjunction with the video processing offload module 224. For example, if a request is received by the camera interface module 218 to open a single video camera, the video processing offload module 224 will open the second video camera. Similarly, if a request is received by the camera interface module 218 to close a single video camera, the video processing offload module 224 will close the second video camera. If a request is received by the camera interface module 218 to set a format for output associated with the single video camera, the video processing offload module 224 will set a format for output associated with the second video camera. If a request is received by the camera interface module 218 to set an operational parameter associated with the single video camera, the video processing offload module 224 will set an operational parameter associated with the second video camera. Many other requests are possible and all are considered within the scope of the present subject matter.

If a request is received by the camera interface module 218 to allocate a number of frame buffers in association with a single camera, the video processing offload module 224 will request the same number of frame buffers to be allocated in association with the second camera. If a request is received by the camera interface module 218 to get the index of a frame buffer associated with the single camera, the video processing offload module 224 may also send a request for an index to a frame buffer associated with the second camera. The camera interface module 218 may return the requested index and this index may be mapped to memory space accessible by the video processing offload module 224 for processing of 3D video content.

Further, if a request to de-queue an outgoing queue associated with an a single video camera is received from the video messenger application 216, the video processing offload module 224 may determine whether a 3D calibration and 3D rectification of first video content and second video content received from the camera_1 220 and the camera_2 222, respectively, is completed. The video processing offload module 224 may send the first video content from the camera_1 220 to the video messenger application 216 via the camera interface module 218 in response to determining that the 3D calibration and the 3D rectification of the first video content and the second video content is not completed. Alternatively, the video processing offload module 224 may send the merged 3D video content to the video messenger application 216 via the camera interface module 218 in response to determining that the 3D calibration and the 3D rectification of the first video content and the second video content is completed. As such, the video processing offload module 224 may control whether the 3D video content is returned to the video messenger application 216 based upon completion of calibration and rectification of video content from the two camera devices.

It should further be noted that the video content the video messenger application 216 receives from the camera interface module 218 is no longer the image captured from one video camera. Instead the video content is the rectified and merged image from two connected webcams (e.g., camera_1 220 and camera_2 222) either in a side-by-side 3D format or in a top and bottom 3D format.

At a receiving device, the merged image may be post-processed to obtain the 3D visual effect. In some 3D displays, hardware for post-processing 3D video content may perform the scaling and merging of the content. Alternatively, a post-processing module (not shown) executing together with a 2D video messenger application may be implemented. The post-processing module obtains a pointer or other reference to a frame buffer of the display device. As such, a pointer to the merged image may be derived from a position of the merged image in the display screen. For the side-by-side format, the left half and right half of the image may be scaled horizontally to the full width of the image. For the top and bottom format, the upper half and lower half of the image may be scaled vertically to the full height of the image. As a result, the left view and the right view of the 3D content may be obtained, again without a change to the existing 2D video messenger application. The left view and right view may then be merged either by doing an odd line and even line interleaving or by setting up an alpha plane for frame sequential rendering of the 3D video content.

FIG. 8 through FIG. 10B below describe example processes that may be executed by such devices, such as the wireless TV 102, to perform the automated wireless three-dimensional (3D) video conferencing via a tunerless television device associated with the present subject matter. Many other variations on the example processes are possible and all are considered within the scope of the present subject matter. The example processes may be performed by modules, such as the camera interface module 218, the video processing offload module 224, and/or executed by the processor 200, associated with such devices. It should be noted that time out procedures and other error control procedures are not illustrated within the example processes described below for ease of illustration purposes. However, it is understood that all such procedures are considered to be within the scope of the present subject matter.

Figure 8:
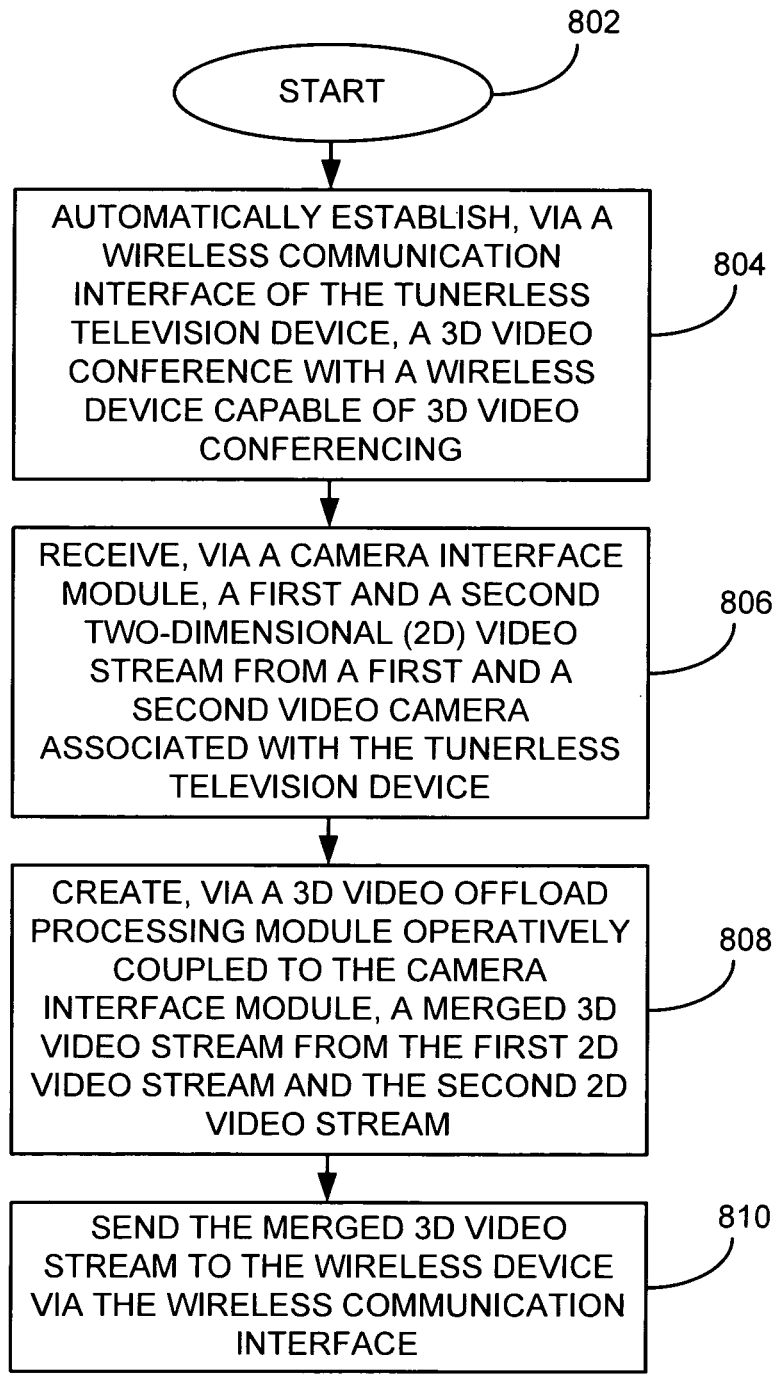
FIG. 8 is a flow chart of an example of an implementation of a process that provides automated wireless 3D video conferencing via a tunerless television device consistent with certain embodiments of the present invention.

FIG. 8 is a flow chart of an example of an implementation of a process 800 that provides automated wireless three-dimensional (3D) video conferencing via a tunerless television device. The process 800 starts at 802. At block 804, the process 800 automatically establishes, via a wireless communication interface of the tunerless television device, a 3D video conference with a wireless device capable of 3D video conferencing. At block 806, the process 800 receives, via a camera interface module, a first and a second two-dimensional (2D) video stream from a first and a second video camera associated with the tunerless television device. At block 808, the process 800 creates, via a 3D video offload processing module operatively coupled to the camera interface module, a merged 3D video stream from the first 2D video stream and the second 2D video stream. At block 810, the process 800 sends the merged 3D video stream to the wireless device via the wireless communication interface.

Figure 9A:
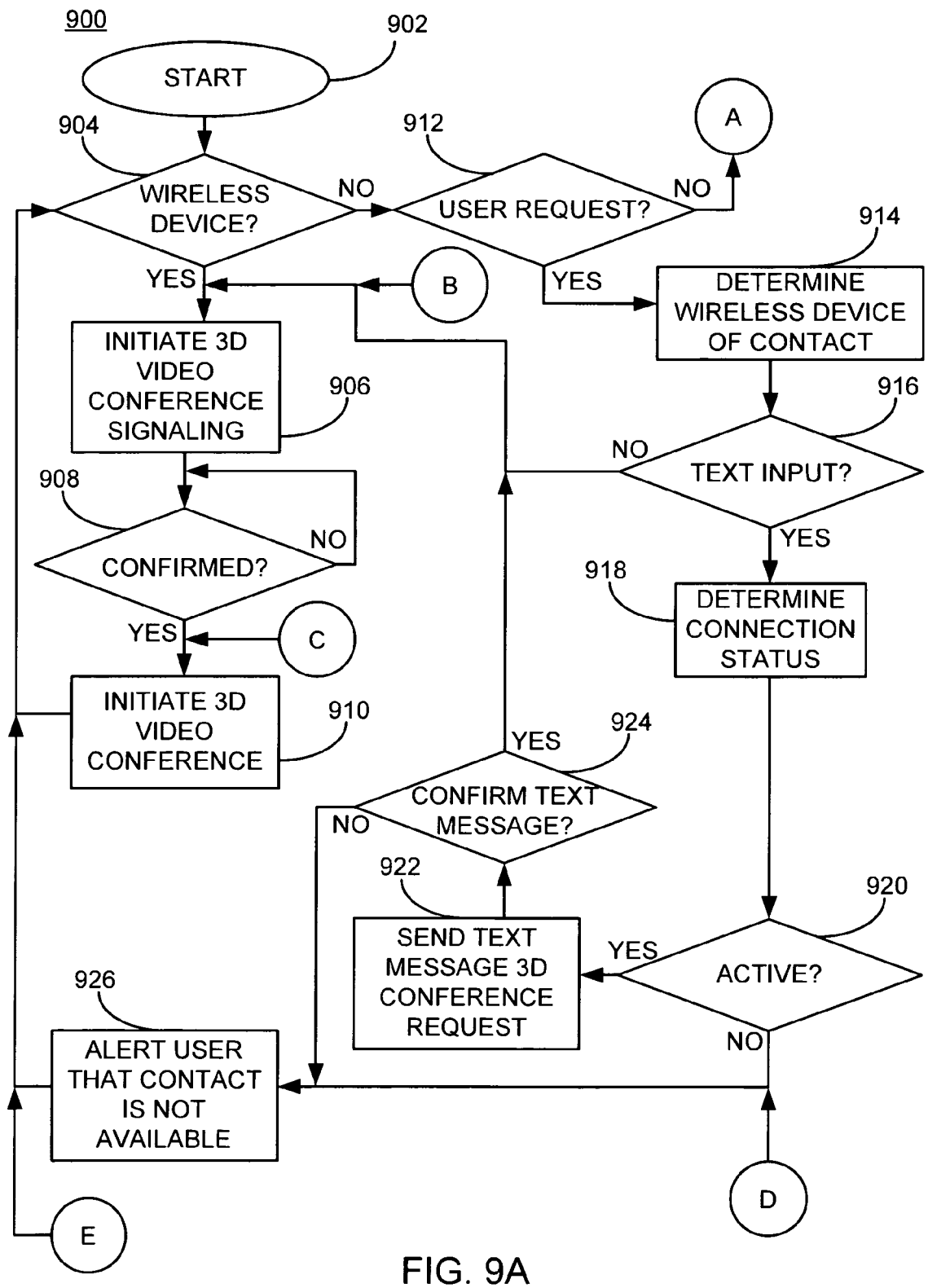
FIG. 9A is a first portion of a flow chart of an example of an implementation of a process for automated wireless 3D video conferencing via a tunerless television device in response to events associated with the tunerless television device consistent with certain embodiments of the present invention.
Figure 9B:
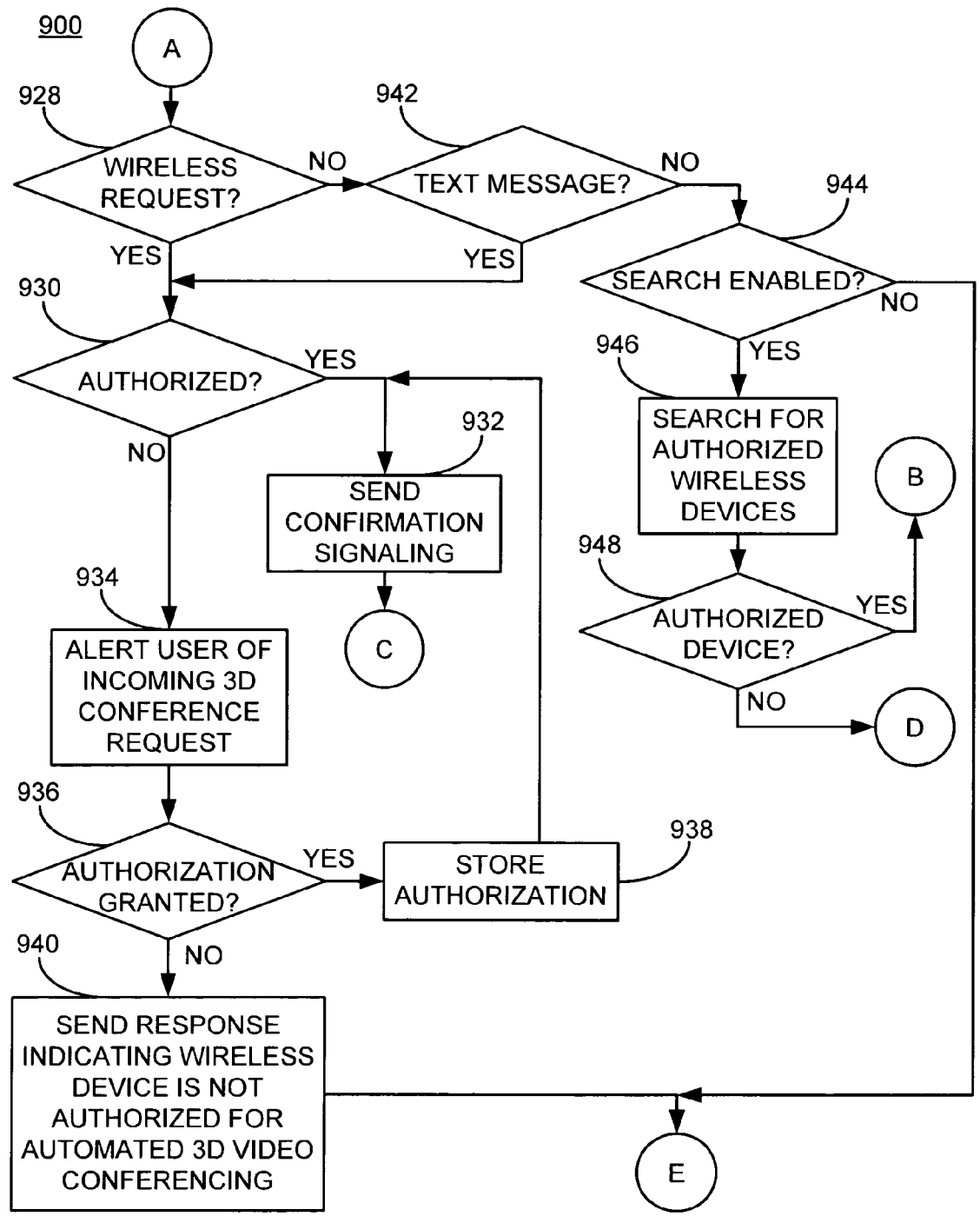
FIG. 9B is a second portion of a flow chart of an example of an implementation of a process for automated wireless 3D video conferencing via a tunerless television device in response to events associated with the tunerless television device consistent with certain embodiments of the present invention.

FIGS. 9A-9B illustrate a flow chart of an example of an implementation of a process 900 for automated wireless three-dimensional (3D) video conferencing via a tunerless television device in response to events associated with the tunerless television device. FIG. 9A illustrates initial processing within the process 900. It should be noted that a higher-level decision loop is distributed across FIG. 9A and FIG. 9B. For ease of description purposes, the higher-level decision loop will not be described in its entirety prior to description of processing associated with certain decision points depicted in FIG. 9A. Reference to each higher-level decision point will be made in association with the description below in an order convenient for description.

The process 900 starts at 902. At decision point 904, the process 900 makes a determination as to whether a wireless device has been detected. As described above, higher-level processing associated with the process 900 will be described in association with processing at individual decision points. As such, processing associated with a determination that a wireless device has not been detected at decision point 904 will be deferred and discussed in more detail below.

When a determination is made at decision point 904 that a wireless device has been detected, the process 900 initiates 3D video conference initiation signaling with the detected wireless device at block 906. At decision point 908, the process 900 makes a determination as to whether 3D video conference confirmation signaling has been received from the wireless device. When a determination is made that 3D video conferencing confirmation signaling has been received from the wireless device, the process 900 initiates the 3D video conference at block 910 and returns to decision point 904.

When a determination is made at decision point 904 that a wireless device has not been detected, the process 900 makes a determination at decision point 912 as to whether a user request to initiate a 3D video conference has been detected. As described above, a user request to initiate a 3D video conference may be detected via a user remote control device. The user request may also be detected in association with a selected contact from a contact list associated with the wireless TV 102. The user remote control device may further include the 3D video conferencing wireless remote control device 308 described above. Again, as described above, higher-level processing associated with the process 900 will be described in association with processing at individual decision points. As such, processing associated with the determination that a user request to initiate a 3D video conference has not been detected will be deferred and described in more detail below.

When a determination is made that a user request to initiate a 3D video conference has been detected at decision point 912, the process 900 determines a wireless device and wireless device information of the selected contact at block 914. The wireless device and wireless device information may include a wireless device phone number, or other information. The wireless device and wireless device information may also be stored, for example, within the contact and authorization information storage area 226 described above.

At decision point 916, the process 900 makes a determination as to whether any text input is associated with the selected contact. A wireless text input device may be used for inputting text associated with the selected contact. The wireless text input device may include a wireless keyboard, a wireless mobile phone configured to communicate with the wireless TV 102, or any other wireless text input-capable device. Text input may also be received in association with a software keyboard associated with the wireless TV 102 controlled via the 3D video conferencing wireless remote control device 308.

When a determination is made that no text input is associated with selected contact, the process 900 returns to block 906 and iterates as described above. When a determination is made at decision point 916 that text input is associated with the selected contact and the user request to initiate a 3D video conference, the process 900 determines a connection status associated with the wireless device of the selected contact at block 918. The wireless device connection status may be determined, for example, via signaling with the wireless device, via presence information associated with the wireless device stored at a server, or via any other approach appropriate for a given implementation.

At decision point 920, the process 900 makes a determination as to whether the wireless device of the selected contact is active. When a determination is made that the wireless device of the selected contact is active, the process 900 sends an automated 3D conference request text message to the wireless device at block 922. At decision point 924, the process 900 makes a determination as to whether a confirmation text message for initiation of a 3D video conference has been received from the wireless device associated with the selected contact. When a determination is made that a confirmation text message has been received from the wireless device associated with the selected contact, the process 900 returns to block 906 and continues processing as described above to initiate the 3D video conference.

When a determination is made at decision point 924 that a confirmation text message has not been received, or upon determining at decision point 920 that the wireless device associated with the selected contact is not active, the process 900 alerts the user that the selected contact is not available at block 926 and returns to decision point 904 and iterates as described above.

Returning to the description of decision point 912, when a determination is made that a user request to initiate a 3D video conference has not been detected, the process 900 transitions to the processing shown in association with FIG. 9B.

FIG. 9B illustrates additional processing associated with the process 900 for automated wireless three-dimensional (3D) video conferencing via a tunerless television device in response to events associated with the tunerless television device. As described above, the higher-level processing associated with the process 900 has been distributed across FIG. 9A and FIG. 9B for ease of description purposes. Decision point 928 is associated with this higher-level processing. At decision point 928, the process 900 makes a determination as to whether a wireless request to initiate an automated 3D video conference has been received from a wireless device. Again, as described above, additional higher-level processing will be deferred. As such, processing associated with a determination that a wireless request to initiate an automated 3D video conference has not been received will be described in more detail below.

When a determination is made that a wireless request to initiate an automated 3D video conference has been received from a wireless device at decision point 928, the process 900 makes a determination at decision point 930 as to whether the wireless device associated with the request is authorized for automated 3D video conferencing. When a determination is made at decision point 930 that the wireless device associated with the request to initiate the automated 3D video conference is authorized for automated 3D video conferencing, the process 900 sends confirmation signaling to the wireless device at block 932 and returns to block 910 as described above in association with FIG. 9A to initiate and establish the 3D video conference. The process 900 iterates as described above in such a situation.

When a determination is made at decision point 930 that the wireless device is not authorized for automated 3D video conferencing, the process 900 alerts the user of the incoming 3D conference request that the wireless device is not presently authorized for automated 3D video conferencing at block 934. At decision point 936, the process 900 makes a determination as to whether authorization to establish a 3D video conference has been granted, such as by a user of the wireless TV 102. When a determination is made that authorization has been granted, the process 900 stores the authorization for this wireless device at block 938 and returns to block 932 and continues iterating as described above.

When a determination is made at decision point 936 that authorization for a 3D video conference has not been granted, the process 900 sends a response to the wireless device indicating that the wireless device is not authorized for automated 3D video conferencing at block 940. The process 900 then returns to decision point 904 and iterates as described above in association with FIG. 9A.

Returning to the description of decision point 928, when a determination is made that a wireless request to initiate an automated 3D video conference has not been received, the process 900 makes the determination at decision point 942, again as part of the higher-level processing associated with the process 900, as to whether a text message has been received from a wireless device. When a determination is made that a text message has been received, the process 900 returns to decision point 930 and iterates as described above to determine whether the wireless device is authorized for automated 3D video conferencing.

When a determination is made at decision point 942 that a text message has not been received, the process 900 makes a determination at decision point 944 as to whether searching for wireless devices for automated 3D video conferencing is enabled. Decision point 944 represents the last higher-level processing decision point within the example process 900.

When a determination is made at decision point 944 that searching for wireless devices that are configured for automated 3D video conferencing is enabled, the process 900 searches for authorized wireless devices at block 946. As described above, authorized wireless devices may include other wireless TV devices, such as the wireless TV 104 or other wireless devices. As such, wireless 3D intercom services may be implemented within a building by searching for configured wireless devices that are powered on and accessible. At decision point 948, the process 900 makes a determination as to whether any device authorized for automated 3D video conferencing has been detected. When a determination is made that an authorized device has been detected, the process 900 returns to FIG. 9A and continues processing at block 906 to automatically establish a 3D video conference and iterates as described above. When a determination is made at decision point 948 that no authorized device has been detected, the process 900 returns to FIG. 9A at block 926 to alert the user that the contact is not available, and iterates as described above.

Returning to the description of decision point 944, when a determination is made that searching for wireless devices for automated 3D video conferencing is not enabled, the process 900 returns to FIG. 9A at decision point 904 and iterates as described above.

As such, the process 900 provides automated 3D video conferencing in response to detecting wireless devices and user requests to initiate an automated 3D video conference, in response to requests for automated 3D video conferencing from wireless devices, and in response to text messages and other events that have been received or identified in association with the wireless TV 102. The process 900 also searches for wireless devices that are configured for automated 3D video conferencing and automatically establishes a 3D video in response to detection of an authorized device.

Figure 10A:
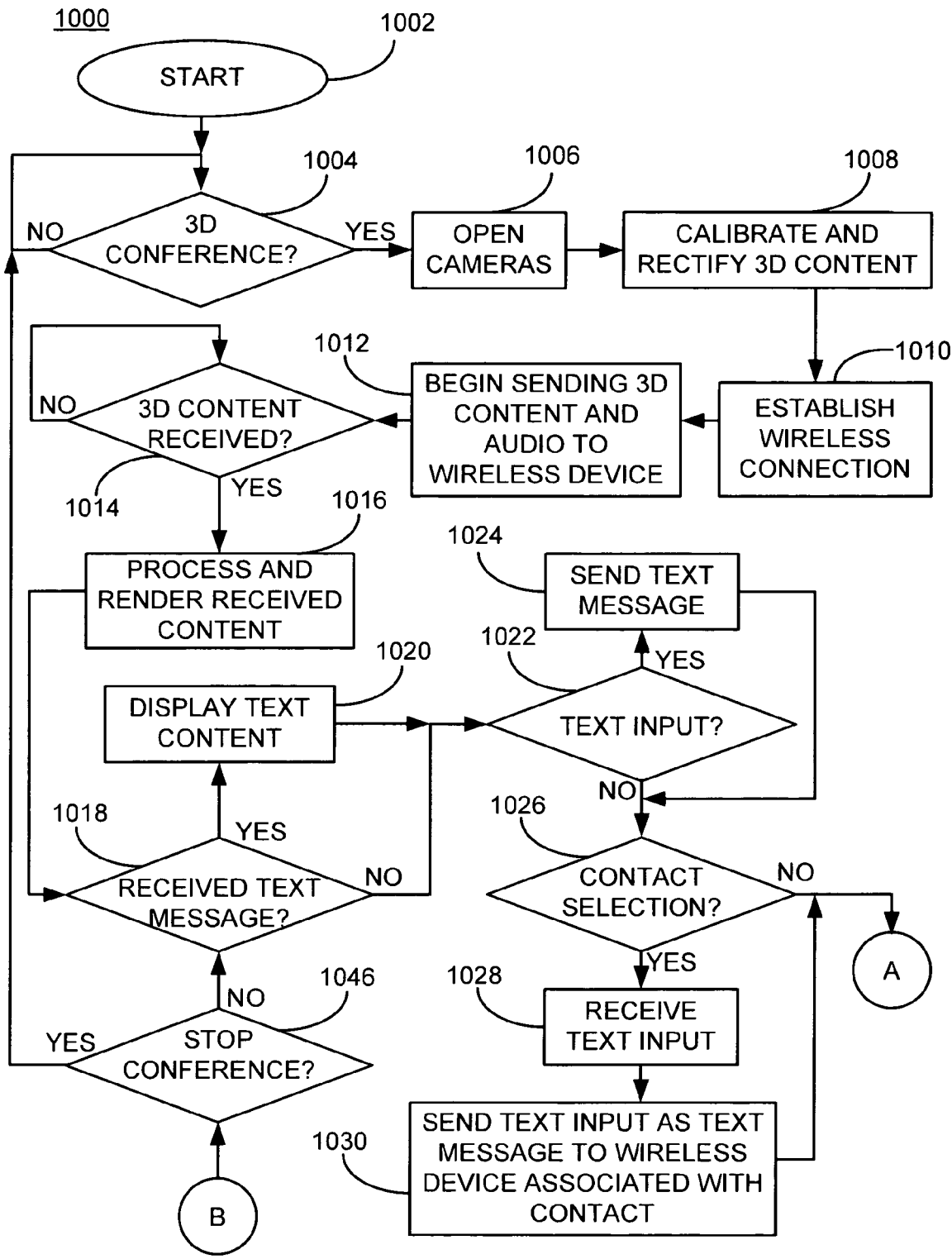
FIG. 10A is a first portion of a flow chart of an example of an implementation of a process for automated wireless 3D video conferencing via a tunerless television device consistent with certain embodiments of the present invention.
Figure 10B:
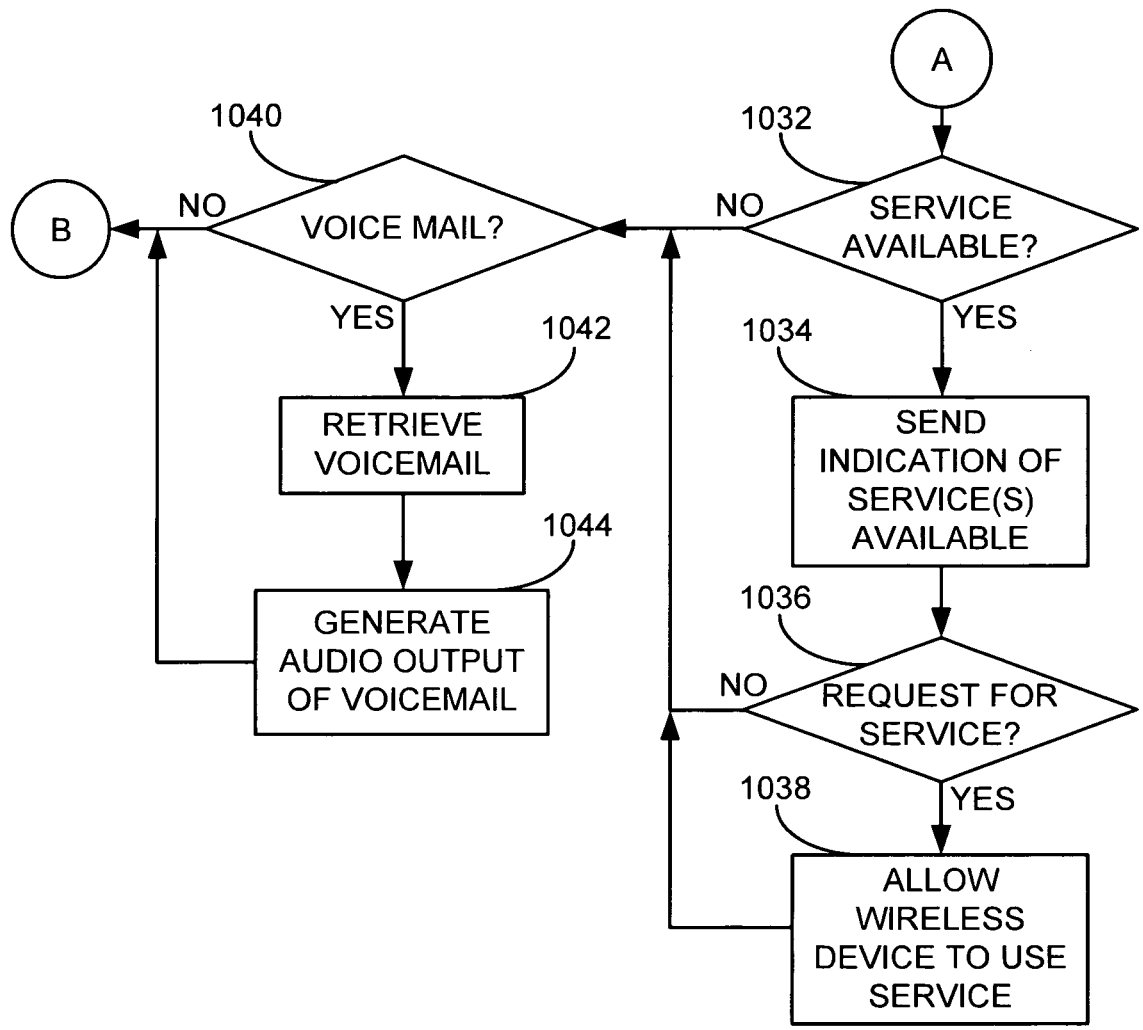
FIG. 10B is a second portion of a flow chart of an example of an implementation of a process for automated wireless 3D video conferencing via a tunerless television device consistent with certain embodiments of the present invention.

FIGS. 10A-10B illustrate a flow chart of an example of an implementation of a process 1000 for automated wireless three-dimensional (3D) video conferencing via a tunerless television device. The process 1000 begins at 1002. For purposes of the present description, processing associated with the process 1000 may be initiated, for example, in association with the processing of FIGS. 9A-9B above to initiate a 3D video conference. Alternatively, the process 1000 may be a stand-alone process for automatically establishing a 3D video conference. As such, at decision point 1004, the process 1000 makes a determination as to whether a 3D video conference has been established (e.g., initiated) or requested, respectively.

When a determination is made at decision point 1004 that a 3D video conference has been established or requested, the process 1000 generates control signals to open available video cameras, such as the camera_1 220 and the camera_2 222, at block 1006. As described above, opening of the available cameras may be performed via a driver module, such as the camera interface module 218.

At block 1008, the process 1000 calibrates and rectifies output received from the available cameras. At block 1010, the process 1000 automatically establishes a 3D video conference if not previously established by other processing, such as over a wireless mesh connection between the wireless TV 102 and another wireless device, such as the wireless TV 104. At block 1012, the process 1000 begins sending 3D video content and audio to the wireless device. In association with sending audio, the process 1000 may receive audio input via an audio input associated with the wireless TV 102, may process the received audio input using noise cancellation and other signal processing, and may send the processed audio to the wireless device in association with the 3D video content.

At decision point 1014, the process 1000 makes a determination as to whether 3D video content has been received from the wireless device. When a determination is made that 3D video content has begun being received, the process 1000 processes and renders the received 3D video content and any associated audio content at block 1016.

At decision point 1018, the process 1000 makes a determination as to whether a text message has been received. When a determination is made that a text message has been received, the process 1000 displays text content associated with the text message at block 1020. As described above in association with FIG. 3, text message content may be displayed within a text message area of a graphical user interface, such as the text message area 306.

When a determination is made at decision point 1018 that a text message has not been received, or upon completion of displaying text content associated with the received message at block 1020, the process 1000 makes a determination at decision point 1022 as to whether any text input has been detected. As such, a user of the wireless TV 102 may reply to text messages that are received or originate new text messages. Accordingly, the process 1000 may detect an indication to reply to a received text message and may detect text input from a wireless text input device associated with the wireless TV 102 for an original text message, as described above.

When a determination is made that text input has been detected at decision point 1022, the process 1000 forms and sends a text message at block 1024. It should further be noted that the wireless TV 102 may receive and initiate text messages from devices other than a wireless device associated with the 3D video conference while a 3D video conference is active. Accordingly, the processing associated with decision points 1018 and 1022 may or may not be associated with an active 3D video conference.

When a determination is made that no text input has been detected at decision point 1022, or upon completion of sending a text message at block 1024, the process 1000 makes a determination at decision point 1026 as to whether a contact selection from a contact list has been detected. When a determination is made that a contact selection from a contact list has been detected, the process 1000 receives text input from a wireless text input device associated with the wireless TV 102, as described above, at block 1028. At block 1030, the process 1000 sends text input as a text message to a wireless device associated with the contact. Again, as described above, the selected contact may be a contact that is or is not associated with an active 3D video conference.

When a determination is made at decision point 1026 that a contact selection has not been detected, or upon completion of sending the text message to a wireless device associated with the selected contact at block 1030, the process 1000 transitions to the processing shown and described in associated with FIG. 10B.

FIG. 10B illustrates additional processing associated with the process 1000 for automated wireless three-dimensional (3D) video conferencing via a tunerless television device. At decision point 1032 (at the top right of FIG. 10B), the process 1000 makes a determination as to whether any shareable services are available at the wireless TV 102. As described above, a shareable service may include shared access to video cameras, such as the camera_1 220 and the camera_2 222 associated with the wireless TV 102, with another wireless device. As well, applications or other services may also be shared. As such, when the process 1000 makes a determination that a shareable service is available, the process 1000 sends an indication of the services that are available via the wireless TV 102 to the wireless device(s) associated with the 3D video conference at block 1034.

At decision point 1036, the process 1000 makes a determination as to whether a request for the shareable service has been received. When a determination is made that a request for the shareable service has been received, the process 1000 allows the wireless device to use the requested service(s) at block 1038. When a determination is made at decision point 1032 that a shareable service is not available, or when a determination is made at decision point 1036 that a request for the available shared services has not been received, or upon allowing the requesting wireless device to use the requested service(s) at block 1038, the process 1000 makes a determination at decision point 1040 as to whether an indication has been received from a telephone answering device, for example, via a wireless communication interface, that a telephone voice mail is available for a user of the wireless TV 102. Such an indication that a telephone voice mail is available may be received from a wireless device, such as a cell phone or wireless-capable telephone answering device.

When a determination is made at decision point 1040 that an indication has been received that a telephone voice mail is available, the process 1000 retrieves the voice mail from the telephone answering device via the wireless communication interface at block 1042. At block 1044, the process 1000 generates an audio output signal of the telephone voice mail via an audio output device, such as the audio output device 210, associated with the wireless TV 102.

In response to making a determination at decision point 1040 that an indication of a voice mail has not been received, or upon generating an audio output associated with a voice mail at block 1044, the process 1000 returns to processing associated with FIG. 10A at decision point 1046.

At decision point 1046, the process 1000 makes a determination as to whether a request has been received to stop 3D video conferencing. When a determination is made that a request to stop 3D video conferencing has not been received, the process 1000 returns to decision point 1018 and iterates as described above. When a determination is made at decision point 1046 that a request to stop 3D video conferencing has been received, the process 1000 returns to decision point 1004 to await a determination as to whether a new 3D video conference has been established or requested.

As such, the process 1000 provides for control of cameras associated with 3D video conferencing at a wireless device, such as the wireless TV 102, and processes text messages that are received or generated during an automated 3D video conference. The text messages may be received from or sent to devices that are associated with the 3D video conference or other devices that are not associated with the 3D video conference. The process 1000 also provides access to shareable services that are available at the wireless TV 102 and processes voice mails associated with wireless voice mail devices accessible by the wireless TV 102.

Though not illustrated within FIGS. 10A-10B for ease of description purposes, it is understood that additional processing may be associated with the process 1000 without departure from the scope of the present subject matter. For example, requests may be detected via a user remote control device, such as the 3D video conferencing wireless remote control device 308, to switch from the 3D video conferencing mode to a 2D video conferencing mode, or to switch from a 2D video conferencing mode to a 3D video conferencing mode. Further, processing associated with generation and selection of default display screens may be associated with the process 1000, as described above. Further, requests to customize default display screens may be received and processed. For example, a request to customize a default display screen with an internet address for default access to content available via the internet address may be received and added to the default display screen within a process such as the process 1000. Many other possibilities exist for processing associated with the processes described above and all are considered within the scope of the present subject matter.

Thus, in accord with certain implementations, a method of automated wireless three-dimensional (3D) video conferencing via a tunerless television device involves automatically establishing, via a wireless communication interface of the tunerless television device, a 3D video conference with a wireless device capable of 3D video conferencing; receiving, via a camera interface module, a first and a second two-dimensional (2D) video stream from a first and a second video camera associated with the tunerless television device; creating, via a 3D video offload processing module operatively coupled to the camera interface module, a merged 3D video stream from the first 2D video stream and the second 2D video stream; and sending the merged 3D video stream to the wireless device via the wireless communication interface.

In certain implementations, the method of automated wireless three-dimensional (3D) video conferencing via a tunerless television device further involves receiving a 3D video stream from the wireless device; processing the received 3D video stream; and rendering the processed 3D video stream via a display associated with the tunerless television device. In certain implementations, the automatically established 3D video conference involves a 3D video conference established over a wireless mesh network connection between the tunerless television device and the wireless device. In certain implementations, the method of automatically establishing, via the wireless communication interface of the tunerless television device, the 3D video conference with the wireless device capable of 3D video conferencing involves detecting, via a wireless connection associated with the wireless communication interface, the wireless device; initiating 3D video conferencing initiation signaling with the wireless device; and receiving 3D video conferencing confirmation signaling from the wireless device. In certain implementations, the method of automatically establishing, via the wireless communication interface of the tunerless television device, the 3D video conference with the wireless device capable of 3D video conferencing involves detecting a request to initiate the 3D video conference via a user remote control device comprising a selected contact from a contact list that is associated with the wireless device; and automatically establishing the 3D video conference with the wireless device in response to the request to initiate the 3D video conference via the user remote control. In certain implementations, the method of automatically establishing, via the wireless communication interface of the tunerless television device, the 3D video conference with the wireless device capable of 3D video conferencing involves receiving a request to initiate an automated 3D video conference from the wireless device; determining whether the wireless device is authorized for automated 3D video conferencing; and automatically establishing the 3D video conference in response to determining that the wireless device is authorized for automated 3D video conferencing. In certain implementations, the method of automatically establishing, via the wireless communication interface of the tunerless television device, the 3D video conference with the wireless device capable of 3D video conferencing involves receiving a text message from the wireless device; determining whether the text message is from a user within a contact list associated with the tunerless television device that is authorized for automated 3D video conferencing; and automatically establishing the 3D video conference in response to determining that the text message is from the user within the contact list associated with the tunerless television device that is authorized for automated 3D video conferencing. In certain implementations, the method of automatically establishing, via the wireless communication interface of the tunerless television device, the 3D video conference with the wireless device capable of 3D video conferencing involves detecting a contact name selection from a contact list of 3D video conferencing contacts and text input associated with a text message from a wireless text input device associated with the tunerless television device; determining that the wireless device is associated with the selected contact name; automatically determining a wireless connection status of the wireless device; sending an automated 3D conference request text message to the wireless device in response to determining the wireless device is active; and automatically establishing the 3D video conference in response to receipt of a confirmation text message from the wireless device. In certain implementations, the wireless text input device involves one of a wireless keyboard and a mobile phone configured to communicate with the tunerless television device via the wireless communication interface. In certain implementations, the method of automatically establishing, via the wireless communication interface of the tunerless television device, the 3D video conference with the wireless device capable of 3D video conferencing involves searching for wireless devices via a wireless connection associated with the wireless communication interface that are authorized for automated 3D video conferencing; determining that the wireless device is active and is authorized for automated 3D video conferencing; and automatically establishing the 3D video conference. In certain implementations, the method further involves providing a default display screen via a display of the tunerless television device, where the default display screen involves an option for 3D video conferencing. In certain implementations, the method further involves receiving a request to customize the default display screen with an Internet address for default access to content available via the Internet address; and adding the Internet address to the default display screen. In certain implementations, the method further involves sending an indication of at least one service available via the tunerless television device via the wireless interface to the wireless device. In certain implementations, the method further involves receiving a request from the wireless device to use one of the at least one of the service available via the tunerless television device; and allowing the wireless device to use the one of the at least one of the service available via the tunerless television device. In certain implementations, the method further involves receiving an indication from a telephone answering device via the wireless communication interface that a telephone voice mail is available for a user of the tunerless television device; retrieving the telephone voice mail from the telephone answering device via the wireless communication interface; and generating an audio output signal of the telephone voice mail via an audio output device associated with the tunerless television device. In certain implementations, the method further involves receiving, during the 3D video conference, text message content from the wireless device associated with the 3D video conference; and displaying the text message content via a display associated with the tunerless television device. In certain implementations, the method further involves detecting an indication to reply to the text message content received from the wireless device associated with the 3D video conference; detecting text input from a wireless text input device associated with the tunerless television device; and sending the text input as a text message to the wireless device associated with the 3D video conference. In certain implementations, the method further involves detecting, during the 3D video conference, a selection of a contact from a contact list; detecting text input from a wireless text input device associated with the tunerless television device; and sending the text input as a text message to a wireless device associated with the selected contact during the 3D video conference. In certain implementations, the method further involves receiving, during the 3D video conference, text message content from a wireless device other than the wireless device associated with the 3D video conference; and displaying the text message content via a display associated with the tunerless television device. In certain implementations, the method further involves detecting an indication to reply to the text message content received from the wireless device other than the wireless device associated with the 3D video conference; detecting text input from a wireless text input device associated with the tunerless television device; and sending the text input as a text message to the wireless device other than the wireless device associated with the 3D video conference. In certain implementations, the method further involves receiving audio input via an audio input device associated with the tunerless television device; processing the received audio input using noise cancellation; and sending the processed audio input to the wireless device. In certain implementations, the method further involves detecting a request via a user remote control to switch from a 3D video conference mode to a 2D video conference mode, and switching the tunerless television device from the 3D video conference mode to the 2D video conference mode. In certain implementations, the merged 3D video stream involves one of frame sequential 3D video content and polarized 3D video content. In certain implementations, the wireless communication interface involves one of a cellular wireless communication interface and a Bluetooth wireless communication interface.

In another implementation, a computer readable storage medium may store instructions which, when executed on one or more programmed processors, carry out a process of automated wireless three-dimensional (3D) video conferencing via a tunerless television device, where the processor is programmed to automatically establish, via a wireless communication interface of the tunerless television device, a 3D video conference with a wireless device capable of 3D video conferencing; receive, via a camera interface module, a first and a second two-dimensional (2D) video stream from a first and a second video camera associated with the tunerless television device; create, via a 3D video offload processing module operatively coupled to the camera interface module, a merged 3D video stream from the first 2D video stream and the second 2D video stream; and send the merged 3D video stream to the wireless device via the wireless communication interface.

An apparatus for automated wireless three-dimensional (3D) video conferencing consistent with another implementation has a wireless communication interface; a camera interface module; a first and a second video camera; a 3D video offload processing module operatively coupled to the camera interface module; and a processor programmed to automatically establish, via the wireless communication interface, a 3D video conference with a wireless device capable of 3D video conferencing; receive, via the camera interface module, a first and a second two-dimensional (2D) video stream from the first and the second video camera; create, via the 3D video offload processing module, a merged 3D video stream from the first 2D video stream and the second 2D video stream; and send the merged 3D video stream to the wireless device via the wireless communication interface.

In certain implementations, the apparatus for automated wireless three-dimensional (3D) video conferencing has a display; and the processor is further programmed to receive a 3D video stream from the wireless device; process the received 3D video stream; and render the processed 3D video stream via the display. In certain implementations, in being programmed to automatically establish, via the wireless communication interface, the 3D video conference with the wireless device capable of 3D video conferencing, the processor is programmed to automatically establish, via the wireless communication interface, the 3D video conference with the wireless device capable of 3D video conferencing over a wireless mesh network connection. In certain implementations, in being programmed to automatically establish, via the wireless communication interface, the 3D video conference with the wireless device capable of 3D video conferencing, the processor is programmed to detect, via a wireless connection associated with the wireless communication interface, the wireless device; initiate 3D video conferencing initiation signaling with the wireless device; and receive 3D video conferencing confirmation signaling from the wireless device. In certain implementations, in being programmed to automatically establish, via the wireless communication interface, the 3D video conference with the wireless device capable of 3D video conferencing, the processor is programmed to detect a request to initiate the 3D video conference via a user remote control device comprising a selected contact from a contact list that is associated with the wireless device; and automatically establish the 3D video conference with the wireless device in response to the request to initiate the 3D video conference via the user remote control. In certain implementations, in being programmed to automatically establish, via the wireless communication interface, the 3D video conference with the wireless device capable of 3D video conferencing, the processor is programmed to receive a request to initiate an automated 3D video conference from the wireless device; determine whether the wireless device is authorized for automated 3D video conferencing; and automatically establish the 3D video conference in response to determining that the wireless device is authorized for automated 3D video conferencing. In certain implementations, in being programmed to automatically establish, via the wireless communication interface, the 3D video conference with the wireless device capable of 3D video conferencing, the processor is programmed to receive a text message from the wireless device; determine whether the text message is from a user within a contact list that is authorized for automated 3D video conferencing; and automatically establish the 3D video conference in response to determining that the text message is from the user within the contact list that is authorized for automated 3D video conferencing. In certain implementations, in being programmed to automatically establish, via the wireless communication interface, the 3D video conference with the wireless device capable of 3D video conferencing, the processor is programmed to detect a contact name selection from a contact list of 3D video conferencing contacts and text input associated with a text message from a wireless text input device; determine that the wireless device is associated with the selected contact name; automatically determine a wireless connection status of the wireless device; send an automated 3D conference request text message to the wireless device in response to determining the wireless device is active; and automatically establish the 3D video conference in response to receipt of a confirmation text message from the wireless device. In certain implementations, the wireless text input device involves one of a wireless keyboard and a mobile phone configured to communicate via the wireless communication interface. In certain implementations, in being programmed to automatically establish, via the wireless communication interface, the 3D video conference with the wireless device capable of 3D video conferencing, the processor is programmed to search for wireless devices, via a wireless connection associated with the wireless communication interface, that are authorized for automated 3D video conferencing; determine that the wireless device is active and is authorized for automated 3D video conferencing; and automatically establish the 3D video conference. In certain implementations, the apparatus has a display; and the processor is further programmed to provide a default display screen via the display, where the default display screen involves an option for 3D video conferencing. In certain implementations, the processor is further programmed to receive a request to customize the default display screen with an Internet address for default access to content available via the Internet address; and add the Internet address to the default display screen. In certain implementations, the processor is further programmed to send an indication of at least one service available via the wireless communication interface to the wireless device. In certain implementations, the processor is further programmed to receive a request from the wireless device to use one of the at least one of the service available via the wireless communication interface; and allow the wireless device to use the one of the at least one of the service available via the wireless communication interface. In certain implementations, the apparatus has an audio output device; and where the processor is further programmed to receive an indication from a telephone answering device via the wireless communication interface that a telephone voice mail is available for a user; retrieve the telephone voice mail from the telephone answering device via the wireless communication interface; and generate an audio output signal of the telephone voice mail via the audio output device. In certain implementations, the apparatus has a display; and the processor is further programmed to receive, during the 3D video conference, text message content from the wireless device associated with the 3D video conference; and display the text message content via the display. In certain implementations, the processor is further programmed to detect an indication to reply to the text message content received from the wireless device associated with the 3D video conference; detect text input from a wireless text input device; and send the text input as a text message to the wireless device associated with the 3D video conference. In certain implementations, the processor is further programmed to detect, during the 3D video conference, a selection of a contact from a contact list; detect text input from a wireless text input device; and send the text input as a text message to a wireless device associated with the selected contact during the 3D video conference. In certain implementations, the apparatus has a display; and the processor is further programmed to receive, during the 3D video conference, text message content from a wireless device other than the wireless device associated with the 3D video conference; and display the text message content via the display. In certain implementations, the processor is further programmed to detect an indication to reply to the text message content received from the wireless device other than the wireless device associated with the 3D video conference; detect text input from a wireless text input device; and send the text input as a text message to the wireless device other than the wireless device associated with the 3D video conference. In certain implementations, the apparatus has an audio input device involving noise cancellation circuitry; and the processor is further programmed to receive audio input via the audio input device; process the received audio input using the noise cancellation circuitry; and send the processed audio input to the wireless device. In certain implementations, the processor is further programmed to detect a request via a user remote control to switch from a 3D video conference mode to a 2D video conference mode; and switch from the 3D video conference mode to the 2D video conference mode. In certain implementations, the merged 3D video stream involves one of frame sequential 3D video content and polarized 3D video content. In certain implementations, the wireless communication interface involves one of a cellular wireless communication interface and a Bluetooth wireless communication interface.

While certain embodiments herein were described in conjunction with specific circuitry that carries out the functions described, other embodiments are contemplated in which the circuit functions are carried out using equivalent elements executed on one or more programmed processors. General purpose computers, microprocessor based computers, microcontrollers, optical computers, analog computers, dedicated processors, application specific circuits and/or dedicated hard wired logic and analog circuitry may be used to construct alternative equivalent embodiments. Other embodiments could be implemented using hardware component equivalents such as special purpose hardware, dedicated processors or combinations thereof.

Certain embodiments may be implemented using one or more programmed processors executing programming instructions that in certain instances are broadly described above in flow chart form that can be stored on any suitable electronic or computer readable storage medium (such as, for example, disc storage, Read Only Memory (ROM) devices, Random Access Memory (RAM) devices, network memory devices, optical storage elements, magnetic storage elements, magneto-optical storage elements, flash memory, core memory and/or other equivalent volatile and non-volatile storage technologies). However, those skilled in the art will appreciate, upon consideration of the present teaching, that the processes described above can be implemented in any number of variations and in many suitable programming languages without departing from embodiments of the present invention. For example, the order of certain operations carried out can often be varied, additional operations can be added or operations can be deleted without departing from certain embodiments of the invention. Error trapping can be added and/or enhanced and variations can be made in user interface and information presentation without departing from certain embodiments of the present invention. Such variations are contemplated and considered equivalent.

While certain illustrative embodiments have been described, it is evident that many alternatives, modifications, permutations and variations will become apparent to those skilled in the art in light of the foregoing description.

What is claimed is:

1. A method of automated wireless three-dimensional (3D) video conferencing via a tunerless television device, comprising:
    automatically establishing, via a wireless communication interface of the tunerless television device, a 3D video conference with a wireless device capable of 3D video conferencing, where in being programmed to automatically establishing, the processor is programmed to:
        receive, at the tunerless television device, a text message from the wireless device;
        determine whether the text message is from a user within a contact list associated with the tunerless television device that is authorized for automated 3D video conferencing; and
        automatically establish the 3D video conference in response to determining that the text message is from the user within the contact list associated with the tunerless television device that is authorized for automated 3D video conferencing;
    receiving, via a camera interface module, a first and a second two-dimensional (2D) video stream from a first and a second video camera associated with the tunerless television device;
    creating, via a 3D video offload processing module operatively coupled to the camera interface module, a merged 3D video stream from the first 2D video stream and the second 2D video stream, where a computation that produces the 3D video stream is carried out in a user space application or a hardware module; and
    sending the merged 3D video stream to the wireless device via the wireless communication interface.

2. The method according to claim 1, further comprising:
    receiving a 3D video stream from the wireless device;
    processing the received 3D video stream; and
    rendering the processed 3D video stream via a display associated with the tunerless television device.

3. The method according to claim 1, where the automatically established 3D video conference comprises a 3D video conference established over a wireless mesh network connection between the tunerless television device and the wireless device.

4. The method according to claim 1, where automatically establishing, via the wireless communication interface of the tunerless television device, the 3D video conference with the wireless device capable of 3D video conferencing comprises:
    detecting, via a wireless connection associated with the wireless communication interface, the wireless device;
    initiating 3D video conferencing initiation signaling with the wireless device; and
    receiving 3D video conferencing confirmation signaling from the wireless device.

5. The method according to claim 1, further comprising providing a default display screen via a display of the tunerless television device, where the default display screen comprises an option for 3D video conferencing.

6. The method according to claim 5, further comprising:
    receiving a request to customize the default display screen with an Internet address for default access to content available via the Internet address; and
    adding the Internet address to the default display screen.

7. The method according to claim 1, further comprising sending an indication of at least one service available via the tunerless television device via the wireless interface to the wireless device.

8. The method according to claim 7, further comprising:
    receiving a request from the wireless device to use one of the at least one of the service available via the tunerless television device; and
    allowing the wireless device to use the one of the at least one of the service available via the tunerless television device.

9. The method according to claim 1, further comprising:
    receiving an indication from a telephone answering device via the wireless communication interface that a telephone voice mail is available for a user of the tunerless television device;
    retrieving the telephone voice mail from the telephone answering device via the wireless communication interface; and
    generating an audio output signal of the telephone voice mail via an audio output device associated with the tunerless television device.

10. The method according to claim 1, further comprising:
receiving, during the 3D video conference, text message content from the wireless device associated with the 3D video conference; and
displaying the text message content via a display associated with the tunerless television device.

11. The method according to claim 10, further comprising:
detecting an indication to reply to the text message content received from the wireless device associated with the 3D video conference;
detecting text input from a wireless text input device associated with the tunerless television device; and
sending the text input as a text message to the wireless device associated with the 3D video conference.

12. The method according to claim 1, further comprising:
detecting, during the 3D video conference, a selection of a contact from a contact list;
detecting text input from a wireless text input device associated with the tunerless television device; and
sending the text input as a text message to a wireless device associated with the selected contact during the 3D video conference.

13. The method according to claim 1, further comprising:
receiving, during the 3D video conference, text message content from a wireless device other than the wireless device associated with the 3D video conference; and
displaying the text message content via a display associated with the tunerless television device.

14. The method according to claim 13, further comprising:
detecting an indication to reply to the text message content received from the wireless device other than the wireless device associated with the 3D video conference;
detecting text input from a wireless text input device associated with the tunerless television device; and
sending the text input as a text message to the wireless device other than the wireless device associated with the 3D video conference.

15. The method according to claim 1, further comprising:
receiving audio input via an audio input device associated with the tunerless television device;
processing the received audio input using noise cancellation; and
sending the processed audio input to the wireless device.

16. The method according to claim 1, further comprising detecting a request via a user remote control to switch from a 3D video conference mode to a 2D video conference mode, and switching the tunerless television device from the 3D video conference mode to the 2D video conference mode.

17. The method according to claim 1, where the merged 3D video stream comprises one of frame sequential 3D video content and polarized 3D video content.

18. The method according to claim 1, where the wireless communication interface comprises one of a cellular wireless communication interface and a Bluetooth wireless communication interface.

19. A computer readable tangible non-transitory storage medium storing instructions which, when executed on one or more programmed processors, carry out a method according to claim 1.

20. An apparatus for automated wireless three-dimensional (3D) video conferencing comprising:
a wireless communication interface;
a camera interface module;
a first and a second video camera;
a 3D video offload processing module operatively coupled to the camera interface module; and
a processor programmed to:
automatically establish, via the wireless communication interface, a 3D video conference with a wireless device capable of 3D video conferencing, where the 3D video conference is automatically established by:
receiving, at the tunerless television device, a text message from the wireless device;
determining whether the text message is from a user within a contact list associated with the tunerless television device that is authorized for automated 3D video conferencing; and
automatically establishing the 3D video conference in response to determining that the text message is from the user within the contact list associated with the tunerless television device that is authorized for automated 3D video conferencing;
receive, via the camera interface module, a first and a second two-dimensional (2D) video stream from the first and the second video camera;
create, via the 3D video offload processing module, a merged 3D video stream from the first 2D video stream and the second 2D video stream, where a computation that produces the 3D video stream is carried out in a user space application or a hardware module; and
send the merged 3D video stream to the wireless device via the wireless communication interface.

21. The apparatus according to claim 20, further comprising:
a display; and
where the processor is further programmed to:
receive a 3D video stream from the wireless device;
process the received 3D video stream; and
render the processed 3D video stream via the display.

22. The apparatus according to claim 20, where, in being programmed to automatically establish, via the wireless communication interface, the 3D video conference with the wireless device capable of 3D video conferencing, the processor is programmed to automatically establish, via the wireless communication interface, the 3D video conference with the wireless device capable of 3D video conferencing over a wireless mesh network connection.

23. The apparatus according to claim 20, further comprising:
a display; and
where the processor is further programmed to provide a default display screen via the display, where the default display screen comprises an option for 3D video conferencing.

24. The apparatus according to claim 23, where the processor is further programmed to:
receive a request to customize the default display screen with an Internet address for default access to content available via the Internet address; and
add the Internet address to the default display screen.

25. The apparatus according to claim 20, where the processor is further programmed to send an indication of at least one service available via the wireless communication interface to the wireless device.

26. The apparatus according to claim 25, where the processor is further programmed to:
receive a request from the wireless device to use one of the at least one of the service available via the wireless communication interface; and
allow the wireless device to use the one of the at least one of the service available via the wireless communication interface.

27. The apparatus according to claim 20, further comprising:

an audio output device; and where the processor is further programmed to:
receive an indication from a telephone answering device via the wireless communication interface that a telephone voice mail is available for a user;
retrieve the telephone voice mail from the telephone answering device via the wireless communication interface; and
generate an audio output signal of the telephone voice mail via the audio output device.

28. The apparatus according to claim 20, further comprising:
a display; and
where the processor is further programmed to:
receive, during the 3D video conference, text message content from the wireless device associated with the 3D video conference; and
display the text message content via the display.

29. The apparatus according to claim 28, where the processor is further programmed to:
detect an indication to reply to the text message content received from the wireless device associated with the 3D video conference;
detect text input from a wireless text input device; and
send the text input as a text message to the wireless device associated with the 3D video conference.

30. The apparatus according to claim 20, where the processor is further programmed to:
detect, during the 3D video conference, a selection of a contact from a contact list;
detect text input from a wireless text input device; and
send the text input as a text message to a wireless device associated with the selected contact during the 3D video conference.

31. The apparatus according to claim 20, further comprising:
a display; and
where the processor is further programmed to:
receive, during the 3D video conference, text message content from a wireless device other than the wireless device associated with the 3D video conference; and
display the text message content via the display.

32. The apparatus according to claim 31, where the processor is further programmed to:
detect an indication to reply to the text message content received from the wireless device other than the wireless device associated with the 3D video conference;
detect text input from a wireless text input device; and
send the text input as a text message to the wireless device other than the wireless device associated with the 3D video conference.

33. The apparatus according to claim 20, further comprising:
an audio input device comprising noise cancellation circuitry; and
where the processor is further programmed to:
receive audio input via the audio input device;
process the received audio input using the noise cancellation circuitry; and
send the processed audio input to the wireless device.

34. The apparatus according to claim 20, where the processor is further programmed to:
detect a request via a user remote control to switch from a 3D video conference mode to a 2D video conference mode; and
switch from the 3D video conference mode to the 2D video conference mode.

35. The apparatus according to claim 20, where the merged 3D video stream comprises one of frame sequential 3D video content and polarized 3D video content.

36. The apparatus according to claim 20, where the wireless communication interface comprises one of a cellular wireless communication interface and a Bluetooth wireless communication interface.

* * * * *